(12) United States Patent
Kreuger

(10) Patent No.: US 9,394,807 B1
(45) Date of Patent: Jul. 19, 2016

(54) APPARATUS, SYSTEM, AND METHODS FOR MECHANICAL ENERGY REGENERATION

(71) Applicant: Sten Kreuger, Chonburi (TH)

(72) Inventor: Sten Kreuger, Chonburi (TH)

( * ) Notice: Subject to any disclaimer, the term of this patent is extended or adjusted under 35 U.S.C. 154(b) by 0 days.

(21) Appl. No.: 14/658,617

(22) Filed: Mar. 16, 2015

(51) Int. Cl.
| | |
|---|---|
| F01K 1/00 | (2006.01) |
| B21D 53/02 | (2006.01) |
| F01K 7/36 | (2006.01) |
| F01K 3/12 | (2006.01) |
| F01K 17/02 | (2006.01) |
| F01K 25/06 | (2006.01) |
| F01K 25/08 | (2006.01) |
| F01K 25/10 | (2006.01) |
| F01K 25/12 | (2006.01) |
| F01K 21/00 | (2006.01) |
| F01K 1/12 | (2006.01) |
| F28D 20/00 | (2006.01) |

(52) U.S. Cl.
CPC ... *F01K 7/36* (2013.01); *F01K 1/12* (2013.01); *F01K 3/12* (2013.01); *F01K 17/02* (2013.01); *F01K 21/00* (2013.01); *F01K 25/06* (2013.01); *F01K 25/08* (2013.01); *F01K 25/10* (2013.01); *F01K 25/12* (2013.01); *F28D 20/0056* (2013.01); *Y10T 29/4935* (2015.01)

(58) Field of Classification Search
CPC ............. F01K 7/36; F01K 1/12; F01K 25/08; F01K 21/00; F01K 25/10; F01K 25/12; F01K 25/06; F01K 17/02; F01K 3/12; Y10T 29/4935; F28D 20/0056
USPC ........... 60/659, 651, 671; 29/890.03, 890.032
See application file for complete search history.

(56) References Cited

U.S. PATENT DOCUMENTS

| | | | | |
|---|---|---|---|---|
| 4,827,735 | A * | 5/1989 | Foley | F25D 16/00 62/260 |
| 5,222,298 | A * | 6/1993 | Schatz | F28D 20/021 165/10 |
| 5,441,097 | A * | 8/1995 | Kanda | F28D 20/0034 165/10 |
| 8,443,605 | B2 | 5/2013 | Ruer | |
| 8,656,712 | B2 | 2/2014 | Howes et al. | |
| 2013/0087301 | A1 * | 4/2013 | Hemrle | F01K 3/12 165/4 |
| 2014/0008033 | A1 * | 1/2014 | Howes | F28D 20/0056 165/10 |
| 2014/0060051 | A1 | 3/2014 | Ohler et al. | |
| 2014/0245756 | A1 | 9/2014 | Morgan et al. | |
| 2015/0075210 | A1 | 3/2015 | Reznik et al. | |

FOREIGN PATENT DOCUMENTS

GB            423093 A    4/1933

* cited by examiner

*Primary Examiner* — Hoang Nguyen
(74) *Attorney, Agent, or Firm* — Andrew D. Fortney; Central California IP Group, P.C.

(57) ABSTRACT

Systems and methods for storing and retrieving thermo-mechanical energy are disclosed. The systems and methods generally include a thermodynamic loop or cycle (e.g., a reversible transcritical, trilateral, or Rankine/vapor compression cycle) that works as a heat pump in a charging mode and as a heat engine in a discharging mode. The thermodynamic loop or cycle includes a gas pressure changing device, a liquid pressure changing device, and a working fluid. The system further includes one or more heat storage devices with solid heat storage material(s). Heat is transferred between the working fluid and the solid heat storage material(s) in the high and low pressure sides of the thermodynamic cycle, respectively.

24 Claims, 10 Drawing Sheets

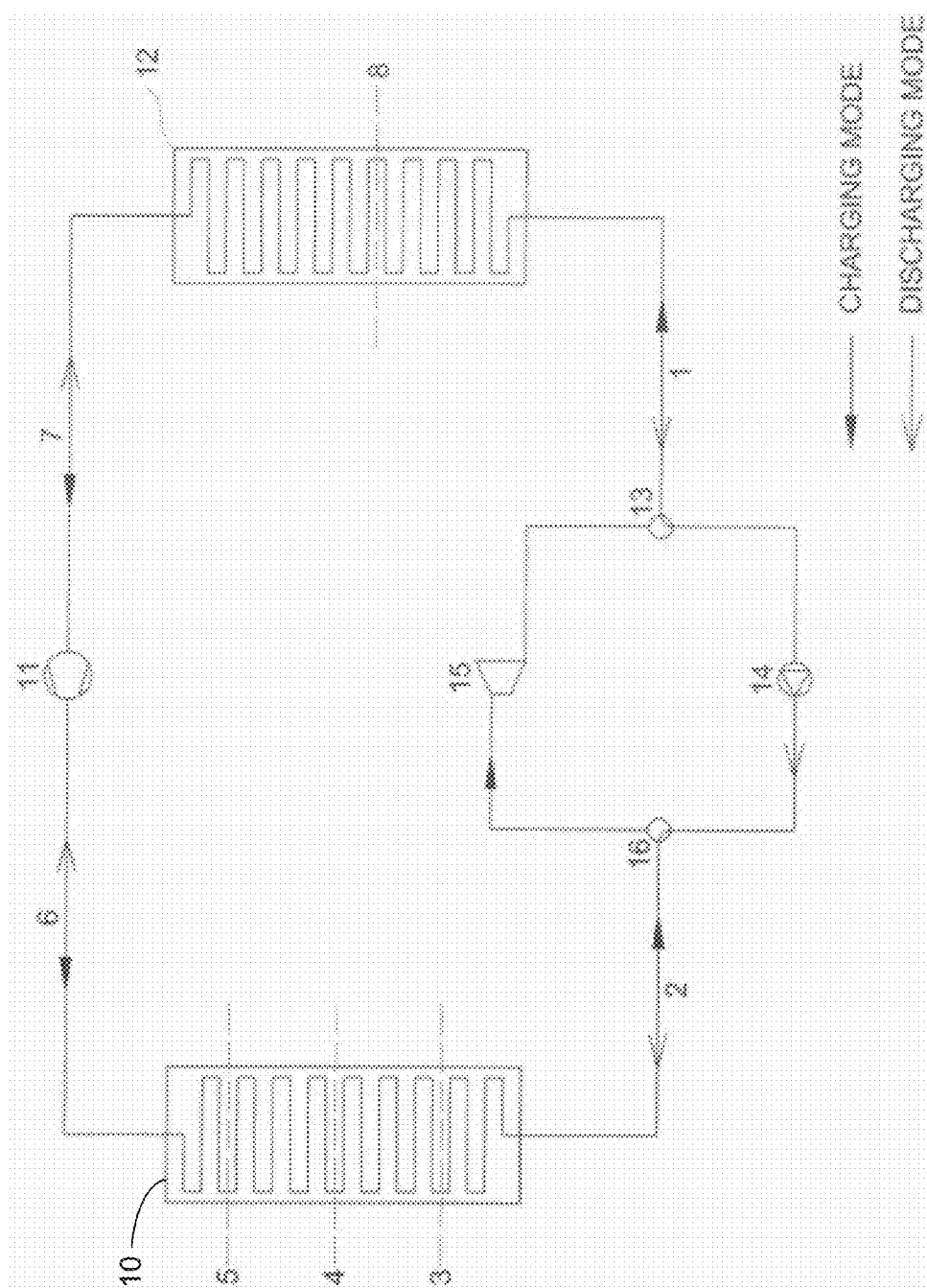

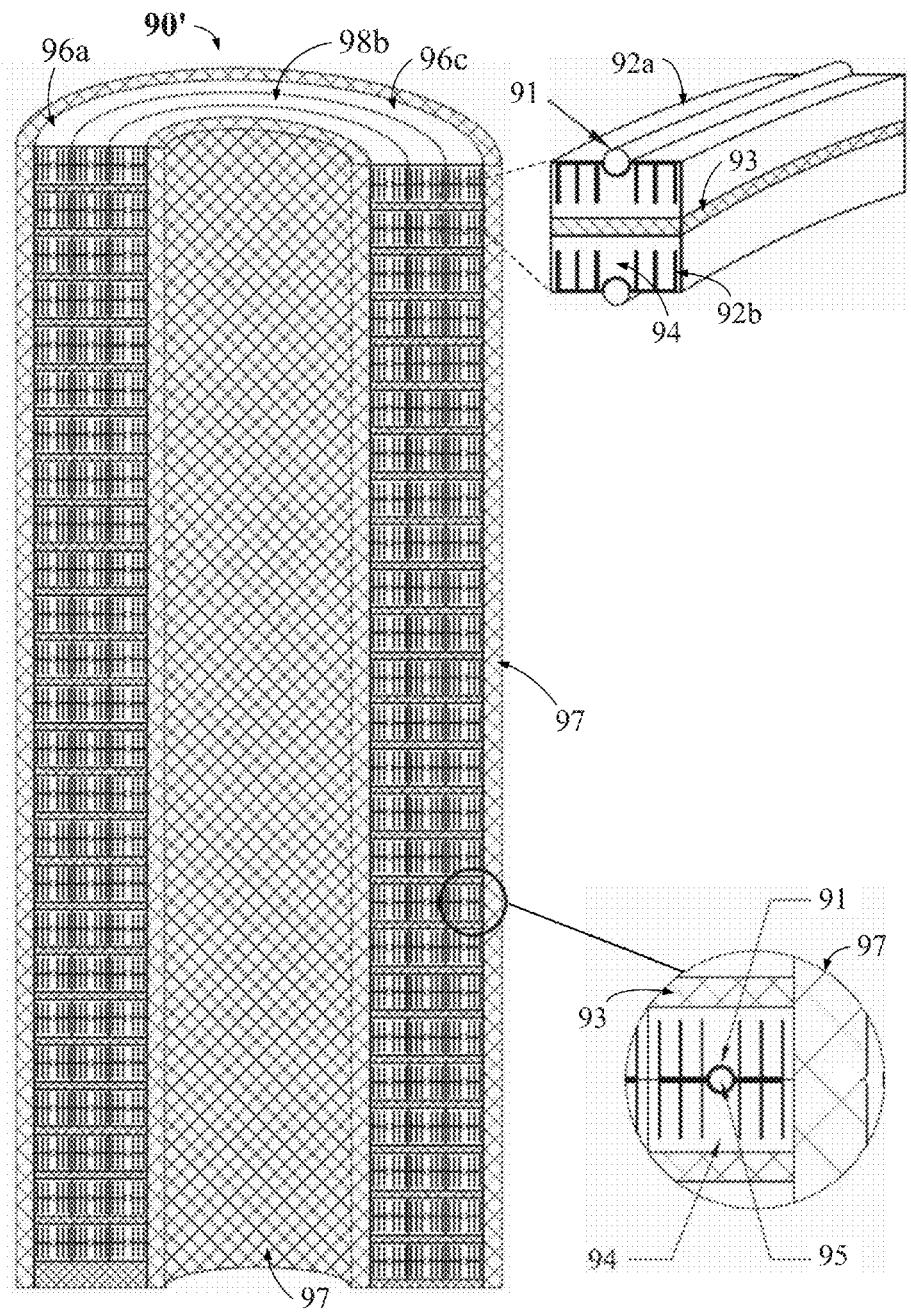

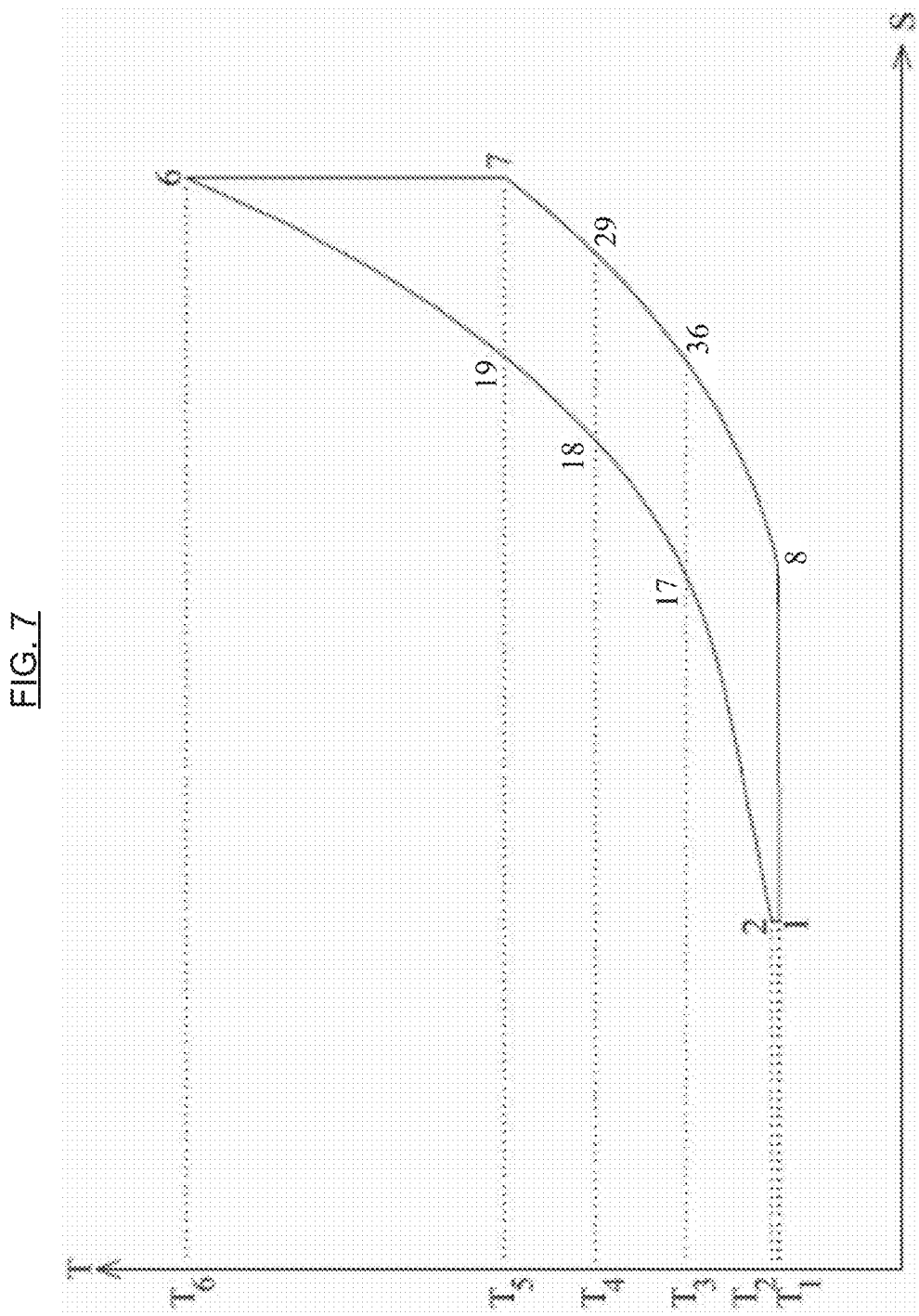

FIG. 9
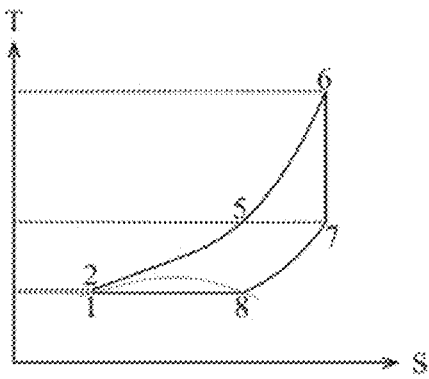
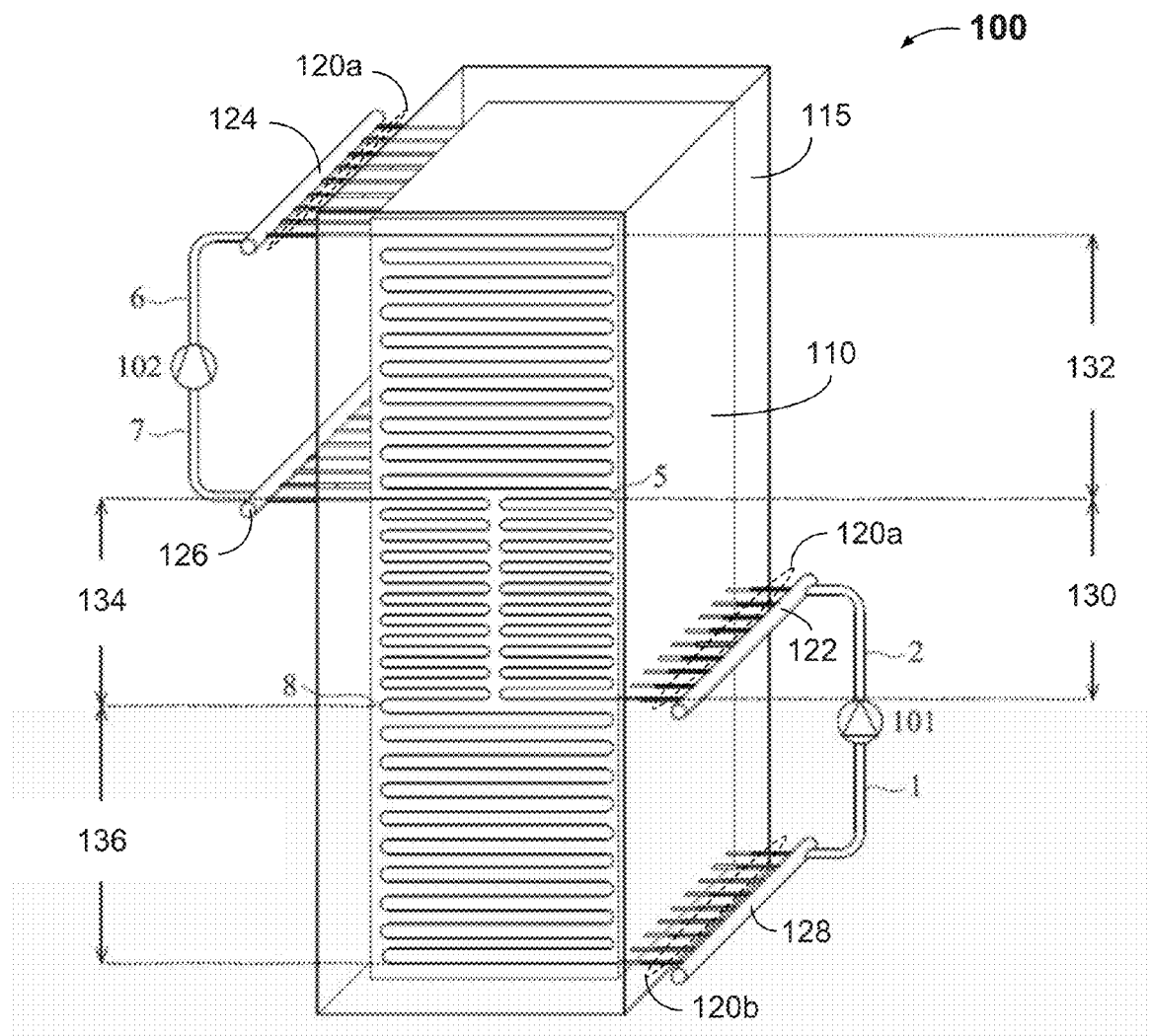

APPARATUS, SYSTEM, AND METHODS FOR MECHANICAL ENERGY REGENERATION

RELATED APPLICATION(S)

The present application may be related to U.S. patent application Ser. No. 14/512,168, filed Oct. 10, 2014, the relevant portions of which are incorporated herein by reference.

FIELD OF THE INVENTION

The present invention generally relates to the field of energy storage and retrieval. More specifically, embodiments of the present invention pertain to methods and systems that use thermal energy for storing and retrieving mechanical energy.

DISCUSSION OF THE BACKGROUND

GB Pat. No. 423093 to Marguerre (1933) disclosed the basic principle of a heat pump and a heat engine for storing mechanical energy as heat in liquid storage media and using a reversible Rankine cycle.

U.S. Pat. No. 8,443,605 to Sapiem and U.S. Pat. No. 8,656,712 to Isotropic Ltd. store heat in a hot and a cold gradient storage with solid material using a Brayton cycle. EP Pat. No. 2778406 to ABB Technology AG stores energy in liquids using a Brayton cycle. WO 2010/145963 by ABB Research Ltd. uses a trilateral cycle and stores energy in liquids.

U.S. Pat. Appl. Publ. No. 2014/0060051 to ABB Research Ltd. discloses use of a zeotropic mixture and four liquid tanks. U.S. Pat. Appl. Publ. No. 2014/0245756 to Highview discloses use of separate liquid air and solid thermal storage media, using both latent heat from the liquid air and sensible heat from the solid media.

The disadvantage with Brayton cycles is low combined efficiency, with the working fluid flowing through two gas compression and two gas expansion processes in a complete charge and discharge cycle. The disadvantage of reversible Rankine cycles is the second law losses from the superheat in charging mode and the gradient preheating of the working fluid in discharging mode. In a transcritical cycle, the main losses are usually due to the difference(s) in heat capacity where the heat exchange occurs, with a variable heat capacity in the working fluid (e.g., the heat capacity of the working fluid varies with temperature at a constant pressure) and a constant heat capacity in the storage fluid. At least some of the systems patented and/or published by ABB compensate with storage fluid flows to and from multiple tanks.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Advantages of the present invention include simplicity, a closed system, and small second law losses due to self-adjustments to variations in heat capacity in the working fluid using solid heat storage media (e.g., due to the capability of solid media to adapt to the temperature of the working fluid). The present system and method advantageously provide an extended temperature range similar to a Brayton cycle, and compression and expansion losses similar to those in a Rankine cycle.

Embodiments of the present invention relate to systems and methods for storing and/or retrieving mechanical energy as heat. The present thermo-mechanical energy storage systems generally include a loop or work in a loop. The loop has a high pressure side and a low pressure side, and comprises one or more heat storage devices including one or more solid heat storage materials with a high pressure liquid connection, a high pressure gas connection, a low pressure liquid connection, and a low-pressure gas connection, a liquid pressure changing device connected between the low pressure liquid connection and the high-pressure liquid connection, a gas pressure changing device connected between the high pressure gas connection and the low-pressure gas connection, and a working fluid in the loop. The loop works as a heat pump in a charging mode and as a heat engine in a discharging mode. The working fluid is in the liquid phase in the low pressure liquid connection and the high-pressure liquid connection, and in the gas phase in the high pressure gas connection and the low-pressure gas connection. The heat storage device(s) may include a low pressure heat storage device including a first solid heat storage material, the low-pressure liquid connection and the low pressure gas connection, and a high pressure heat storage device including a second solid heat storage material, the high-pressure liquid connection and the high-pressure gas connection. Alternatively, a single heat storage device may include a low pressure section including the low-pressure liquid connection and the low pressure gas connection, and a high pressure section including the high-pressure liquid connection and the high-pressure gas connection. The liquid connections and the gas connections are each made to pipes or a framework of pipes inside the respective heat storage devices (or sections of a single heat storage device), along which heat exchange occurs between the working fluid and the heat storage material. Thus, the working fluid transfers or exchanges heat with the solid heat storage material(s) occur along the pipes in the high and low pressure heat storage devices or sections (e.g., the high and low pressure heat storage devices may each comprise one or more regenerators). The working fluid flows in one direction in the loop in the charging mode, and in an opposite direction in the discharging mode.

In many embodiments, the loop comprises a reversible thermodynamic loop or cycle. In various examples, the reversible thermodynamic loop or cycle comprises a reversible transcritical, trilateral, or Rankine thermodynamic loop or cycle, but is not necessarily limited thereto, except that the loop or cycle has a liquid-phase working fluid in at least a part of the loop or cycle. In some examples, the reversible thermodynamic loop or cycle comprises a transcritical or Rankine loop or cycle, and the working fluid and the second solid heat storage material transfer or exchange heat in isothermal and gradient heat exchange processes (i.e., the low-pressure regenerator performs an isothermal heat transfer or exchange process and a gradient heat transfer or exchange process). Alternatively, the reversible thermodynamic loop or cycle comprises a trilateral thermodynamic loop or cycle, and the working fluid and the second solid heat storage material transfer or exchange heat in an isothermal heat exchange process (i.e., the low-pressure regenerator performs an isothermal heat transfer or exchange process). The working fluid is in the liquid phase in the low temperature pressure changing device.

In variations of the system, the working fluid is a condensable (and/or vaporizable) fluid. The working fluid may comprise air (which may be free or substantially free of higher boiling point contaminants such as water and carbon dioxide), a noble gas, water, carbon dioxide, ammonia, a vaporizable liquid metal, a vaporizable liquid salt, an organic fluid or a combination thereof. However, in one set of embodiments (e.g., that use a zeotropic working fluid), the working fluid comprises a combination of air, noble gas, water, carbon dioxide, liquid metal(s), liquid salt(s), and/or organic fluid(s), preferably a liquid-phase combination of organic fluids, combination of gases (e.g., carbon dioxide and helium), or combination of water and ammonia.

Each of the first and second heat storage devices in the thermo-mechanical energy storage system comprises a solid material. In general, such "solid" heat storage devices further include a network of pipes, conduits or passages through the solid material for transfer or transportation of the working fluid and heat transfer or exchange between the working fluid and the solid material. For example, the solid material may comprise concrete, a metal, a glass, a ceramic, or a plastic.

In some embodiments, each of the high pressure and low pressure heat storage devices or sections may comprise a prefabricated skeleton or framework of pipes or tubes, and a form or housing containing the prefabricated skeleton or framework of pipes or tubes. In such embodiments, the solid material(s) are contained within the form or housing. In further embodiments, the thermo-mechanical energy storage system further comprises an isolation material that maintains the pipes or tubes in position during transportation and/or introduction of the solid material into the form or housing. The isolation material thermally isolates the pipes or tubes from each other in order to reduce or diminish the second law losses between layers of the tubes (in this case, due to vertical heat conduction).

In certain embodiments or modes of the thermo-mechanical energy storage and retrieval system, the liquid pressure changing device comprises a pump, and the gas pressure changing device comprises an expander. In alternative embodiments or modes of the thermo-mechanical energy storage system, the liquid pressure changing device comprises a turbine, and the gas pressure changing device comprises a compressor.

The thermo-mechanical energy storage and retrieval systems described herein include at least two devices (or one device with two or more sections) for energy storage and retrieval. The thermo-mechanical energy storage and retrieval system removes heat from a first device in the system and adds heat to the second device in the charging mode to create or increase a temperature differential between the first and second devices. The temperature in the heat storage device(s) can be higher or lower than the temperature of the surrounding environment, which can be an ambient temperature, but is not limited thereto. The heat storage devices can also comprise a "cold" storage device (e.g., where the temperature differential between the storage devices being charged is increasing during the charging process).

The systems described herein have at least one charging mode of operation and at least one discharging mode of operation. Charging mode may occur when heat is added to one heat storage device or section and removed from another heat storage device or section to increase the difference in temperature and/or pressure relative to the other heat storage device or section. Discharging mode may occur when heat is added to the other heat storage device or section and removed from the one heat storage device or section to decrease the difference in temperature and/or pressure between the heat storage devices or sections.

In some embodiments, the thermo-mechanical energy storage and retrieval system comprises a first tank or storage vessel including a first heat storage medium at a first temperature (e.g., a first regenerator), a second tank or storage vessel including a second heat storage medium at a second temperature different from (e.g., lower or significantly lower) than the first temperature (e.g., a second regenerator), a working fluid configured to transfer heat between the first and second heat storage mediums, respectively, and the loop (e.g., a reversible thermodynamic cycle). Each of the heat storage mediums is a solid at the first and second temperatures, and exchanges or transfers heat using (i) a gradient (and, optionally, an isothermal) heat exchange process in the first heat storage device and (ii) isothermal and/or gradient heat exchange processes in the second heat storage device. One significant advantage of the present thermo-mechanical energy storage and retrieval system is that it can avoid external heat exchangers (e.g., that exchange heat with the external environment or with a device not included in the system). The present thermo-mechanical energy storage and retrieval system integrates the heat storage devices with the loop (e.g., when the pipes or tubes carrying the working fluid are part of the heat storage framework).

Another aspect of the present invention relates to a method of storing energy, generally comprising absorbing heat in a liquid-phase working fluid in a low pressure side of a thermodynamic cycle from a solid heat storage material in a low-pressure heat storage device or section; compressing or otherwise increasing a pressure of the working fluid; rejecting heat from the working fluid in a high-pressure side of the thermodynamic cycle to a solid heat storage material in a high-pressure heat storage device or section; and performing mechanical work using the working fluid as the working fluid moves from the high-pressure heat storage device or section to the low-pressure heat storage device or section. In some embodiments, the mechanical work is performed by driving a turbine with the working fluid.

A still further aspect of the present invention relates to a method of retrieving energy, generally comprising absorbing heat in a working fluid in a high pressure side of a thermodynamic cycle from a solid heat storage material in a high-pressure heat storage device or section; expanding or otherwise decreasing a pressure of the working fluid to perform mechanical work using the working fluid; rejecting heat from the working fluid in a low-pressure side of the thermodynamic cycle to a solid heat storage material in a low-pressure heat storage device or section; and pumping the working fluid from the low-pressure heat storage device or section to the high-pressure heat storage device or section. In some embodiments, heat is absorbed by the liquid-phase working fluid in the high pressure side of the thermodynamic cycle from the solid heat storage material in the first heat storage device or first section thereof across a temperature gradient, and heat is rejected by the gas-phase working fluid in the low-pressure side of the thermodynamic cycle to the solid heat storage material in the second heat storage device or the second section of the first heat storage device isothermally. Further embodiments of the method of retrieving energy include reversing a flow of the working fluid, absorbing heat in the liquid-phase working fluid in the low pressure side of the thermodynamic cycle from the solid heat storage material in the second heat storage device or second section of the first heat storage device, thereby changing at least some of the liquid-phase working fluid to the gas-phase working fluid, and rejecting heat from the gas-phase working fluid in the high pressure side of the thermodynamic cycle to the solid heat storage material in the first heat storage device or the first section thereof, thereby changing at least some of the gas-phase working fluid to the liquid-phase working fluid.

An even further aspect of the present invention relates to a method of making a heat storage device, which may comprise assembling a skeleton or framework of pipes or tubes; forming a form or housing of the heat storage device containing the skeleton or framework of pipes or tubes; and pouring the first and second solid heat storage materials in a temporary liquid form into the form or housing of the heat storage device(s) at a final destination or location of the energy storage system. In further embodiments, the skeleton or framework of pipes or tubes permits the temporary liquid form of the solid heat storage material(s) to flow along the pipes or tubes and substantially fill the form or housing and produce a relatively thick heat storage skin around the pipes or tubes. In some embodiments, the pipes or tubes comprise a group of substantially parallel pipes or tubes that traverse at least a portion of the form or housing from a first end or surface of the form or housing to a different end or surface of the form or housing.

The above advantages of the present invention and others will become readily apparent from the detailed description of various embodiments below.

BRIEF DESCRIPTION OF THE DRAWINGS

FIG. 2 is a diagram showing an exemplary layout for a system that stores and retrieves mechanical energy as heat or thermal energy using any of the exemplary reversible thermodynamic cycles of FIG. 1 and heat storage devices that include solid-phase storage media, according to one or more embodiments of the present invention.

FIG. 6 is a diagram showing a further embodiment of the exemplary heat storage device, according to the present invention.

FIG. 7 is a temperature-entropy (TS) diagram showing an exemplary alternative reversible thermodynamic cycle that can store and retrieve mechanical energy as heat or thermal energy with relatively high efficiency for applications where space and/or weight for the heat storage devices is limited, according to one or more embodiments of the present invention.

FIG. 9 is a layout diagram showing an exemplary device with both high pressure (high temperature) and low pressure (low temperature) heat storage sections that can use the exemplary reversible transcritical thermodynamic cycle of FIG. 1A.

DETAILED DESCRIPTION

Figure 1A:
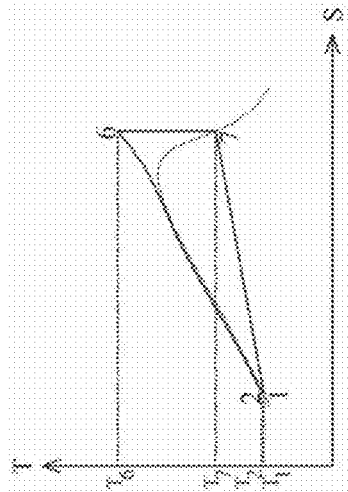
FIGS. 1A-E are temperature-entropy (TS) diagrams showing exemplary reversible thermodynamic cycles that can be used with the heat storage devices described herein to store and retrieve mechanical energy as heat or thermal energy according to one or more embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "loop," "cycle" and "thermodynamic cycle" are generally used interchangeably herein, but are generally given their art-recognized meanings. Also, for convenience and simplicity, the terms "connected to," "coupled with," "coupled to," and "in communication with" may be used interchangeably, as may the terms "tank" and "vessel," and the terms "pipe," "tube" and "conduit," and use of one of the terms in one of these groups will generally include the others unless the context of use clearly indicates otherwise, but these terms are also generally given their art-recognized meanings. For convenience, a flow from a first identified point to a second identified point in a thermodynamic cycle may be represented by a designation "X-Y," where X is the first identified point in the cycle and Y is the second identified point in the cycle. Also, a "gradient" heat transfer, a "gradient" process and/or a "gradient" heat exchange refers to a transfer or exchange of thermal energy or heat across a temperature gradient, and a "solid" material refers to a material or substance that is in the solid phase at temperature intervals of the heat exchanges in which it participates.

The present invention is based on a reversible thermodynamic cycle or loop, and combines the advantages of transcritical, trilateral and Rankine cycles while it eliminates the disadvantage of the Brayton cycle (i.e., with one gas compression process and one gas expansion process) and uses separate solid heat storage devices or different sections of a single heat storage device to exchange heat across a temperature gradient to reduce external second law losses to outside the system. The complete charge and discharge cycle can operate with as few as two gas pressure changing processes. There are relatively small roundtrip (cyclic) losses in heating and cooling processes in the present cycle.

The system uses a closed loop to contain the working fluid in the thermodynamic cycle, which in one example, can include air (which is liquefied in part of the cycle). Due to the closed loop, the air used as the working fluid in the present thermodynamic cycle can avoid contamination with substances such as water and $CO_2$, which are typically in air and which can adversely introduce frozen/solid particles into the working fluid that may harm the components and/or operation of the system.

With well-designed, separate heat storage devices in the high and the low pressure sides of the thermodynamic cycle, the storage and retrieval of heat may be done without any large temperature differences (i.e., with a relatively small temperature difference) between the working fluid and the heat storage material(s). Accordingly, the present system can store and retrieve thermal energy with relatively small second law losses.

Another advantage of separate solid heat storage devices that exchange heat across a temperature gradient is that such devices automatically compensate for a different or variable heat capacity of the working fluid in the heat exchange processes along the heat transfer line(s) by using a relatively long part of the transfer line(s) when the heat capacity of the working fluid is higher than the heat capacity of the storage medium, and a relatively short part of the transfer line(s) when the heat capacity of the working fluid is lower than the heat capacity of the storage medium.

A still further advantage of the present invention (by design) is a reduced number of components included in the system. The simplicity of the system benefits the processes for manufacturing, operation and maintenance, giving a cost effective solution available for a wider scope of applications. Furthermore, the volume of the working fluid in the thermodynamic cycle may be small in comparison to the volume of the heat storage material(s). The working fluid that evaporates during the low temperature storage can be condensed at higher pressure in the high temperature storage process. Consequently, the system can be closed, with all of the attendant advantages of a closed system.

The invention, in its various aspects, will be explained in greater detail below with regard to exemplary embodiments.

Exemplary Thermal Energy Cycles

FIGS. 1A-E show temperature-vs.-entropy ("TS") diagrams for various reversible thermodynamic cycles capable of storing and retrieving mechanical energy as heat, using two heat storage devices. Each of the reversible thermodynamic cycles of FIGS. 1A-E can be used in or applied to the exemplary layout in FIG. 2.

FIG. 1A shows a TS diagram for a reversible transcritical thermodynamic cycle. In discharging mode, 1-2 is a pressure increasing (e.g., pumping) process, in which the temperature may increase slightly (e.g., from a first temperature $T_1$ to a second temperature $T_2$). 2-6 is a heat transfer process across a temperature gradient where the working fluid changes from liquid to gas (e.g., continuously) while the working fluid is heated from $T_2$ to a third temperature $T_6$, and 6-7 is an adiabatic gas expansion process that lowers the temperature and the pressure of the working fluid. In the part of the cycle at 6-7, the working fluid is still in the gas phase. The temperature of the working fluid is reduced from $T_6$ at 6 to a fourth temperature $T_7$ at 7. 7-8 is another heat exchange process across a temperature gradient that cools the working fluid in the transcritical cycle from $T_7$ back to the first temperature $T_1$, and 8-1 is an isothermal condensation process at temperature $T_1$.

The transcritical thermodynamic cycle of FIG. 1A may function as a heat engine in the discharging mode. The heat absorption process at 2-6 occurs in the high-pressure side of the transcritical thermodynamic cycle, and the heat rejection process(es) at 7-8 and 8-1 occur in the low-pressure side of the transcritical thermodynamic cycle.

The cycle is reversed in the charging mode, in which case the transcritical thermodynamic cycle of FIG. 1A may function as a heat pump. In the charging mode, 1-8 is an isothermal evaporation process at temperature $T_1$, 8-7 is a heat exchange process across a temperature gradient that heats the working fluid in the transcritical cycle from $T_1$ to $T_7$, and 7-6 is an adiabatic gas compression process that increases the temperature of the working fluid (e.g., in the gas phase) from $T_7$ to $T_6$. 7-6 also increases the pressure of the working fluid. 6-2 is a heat exchange process across a temperature gradient where the working fluid changes from gas to liquid (e.g., continuously) while the working fluid is cooled from $T_6$ to $T_2$, and 2-1 is a pressure decreasing process (e.g., a process that performs mechanical work using the pressure of the working fluid, such as turning the blades of a turbine). In the charging cycle, the heat rejection process at 6-2 occurs in the high-pressure side of the transcritical thermodynamic cycle, and the heat absorption process(es) at 1-8 and 8-7 occur in the low-pressure side of the transcritical thermodynamic cycle.

The transcritical thermodynamic cycle of FIG. 1A may function as a heat engine or heat pump in a thermal energy storage system, and thus may charge the thermal energy storage system (not shown) by removing heat from one heat storage device to another heat storage device in the energy storage system and building a temperature difference between the two heat storage devices in the charging cycle or mode. In a discharging cycle or mode, the energy can be retrieved by moving the heat back again to the original heat storage device and reducing the temperature difference between the two heat storage devices.

In various examples, the working fluid in the exemplary cycle can be a gas or liquid such as air, a noble gas (e.g., helium, neon, argon, krypton, etc.), water, carbon dioxide, ammonia, a liquid metal or liquid alloy of two or more metals, a liquid salt, or a liquid-phase combination or mixture of two or more gases, organic fluids, or other condensable fluids or substances or media that are typically in the gas phase during part of the cycle and in the liquid phase during another part of the cycle (e.g., mixtures of water and ammonia, carbon dioxide and helium, etc.). One skilled in the art can select a working fluid that can meet such a condition under the temperatures and pressures in the cycle, and can modify the cycle to an extent necessary or desirable to ensure that the selected working fluid is in the gas phase during part of the cycle and in the liquid phase during another part of the cycle.

Figure 1B:
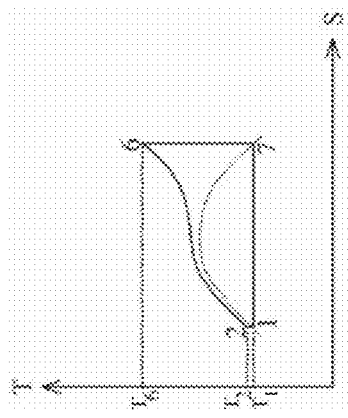

FIG. 1B shows a TS diagram for a reversible transcritical and trilateral thermodynamic cycle. In discharging mode, 1-2 is a pressure increasing (e.g., pumping) process, in which the temperature may increase slightly from $T_1$ to $T_2$. 2-6 is a heat absorption process across a temperature gradient where the working fluid changes from liquid to gas (e.g., continuously) while the working fluid is heated from $T_2$ to $T_6$. The heat absorption process at 2-6 occurs in the high-pressure side of the transcritical and trilateral thermodynamic cycle. 6-7 is an adiabatic gas expansion process that lowers the temperature and the pressure of the working fluid while the working fluid is still in the gas phase. However, at 7, the temperature of the working fluid is reduced to its condensation (e.g., boiling) point at the pressure in that part of the cycle. 7-1 is an isothermal condensation process at temperature $T_1$. The isothermal heat rejection process at 7-1 occurs in the low-pressure side of the transcritical and trilateral thermodynamic cycle of FIG. 1B. The transcritical thermodynamic cycle of FIG. 1B may function as a heat engine in the discharging mode.

In the charging mode, the transcritical and trilateral thermodynamic cycle of FIG. 1B may function as a heat pump. In the charging mode, 1-7 is an isothermal evaporation process at temperature $T_1$, and 7-6 is an adiabatic gas compression process that increases the temperature of the working fluid (e.g., in the gas phase) from $T_1$ to $T_6$. 7-6 also increases the pressure of the working fluid. 6-2 is a heat rejection process across a temperature gradient where the working fluid changes from gas to liquid while the working fluid is cooled from $T_6$ to $T_2$, and 2-1 is a pressure decreasing process (e.g., a process that performs mechanical work). In the charging cycle, the heat rejection process at 6-2 occurs in the high-pressure side of the cycle, and the heat absorption process at 1-7 occurs in the low-pressure side of the cycle. Otherwise, the transcritical and trilateral thermodynamic cycle of FIG. 1B is substantially the same as the transcritical thermodynamic cycle of FIG. 1A.

Figure 1C:
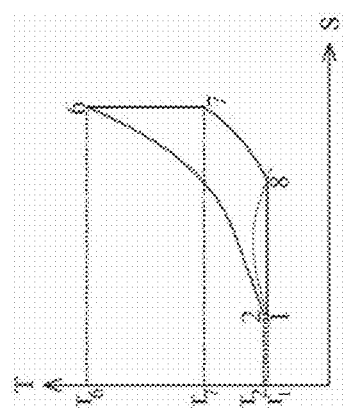

FIG. 1C shows a TS diagram for a reversible transcritical and trilateral thermodynamic cycle that uses a zeotropic fluid as the working fluid. The reversible transcritical and trilateral thermodynamic cycle of FIG. 1C is similar to or substantially the same as the reversible transcritical and trilateral thermodynamic cycle of FIG. 1B, except that the heat exchange (i.e., heat absorption and/or heat rejection) processes at 2-6 and 6-2 have a linear or substantially linear range, and the heat exchange processes at 7-1 and 1-7 (i.e., between temperatures $T_1$ and $T_7$) are not strictly isothermal. Because a zeotropic (mixed) working fluid is used in the thermodynamic cycle of FIG. 1C, the process 1-7 is a heat exchange across a slight temperature gradient.

Figure 1D:
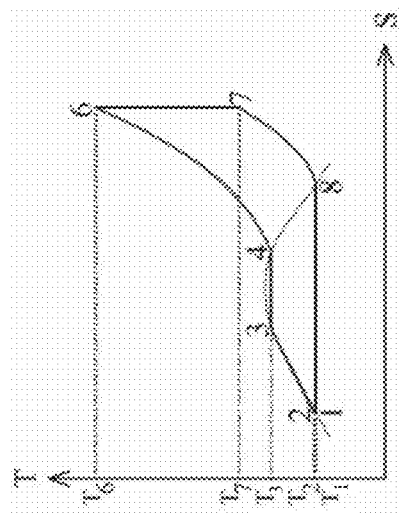

FIG. 1D shows a TS diagram for a reversible trilateral thermodynamic cycle. In discharging mode, 1-2 is a pressure increasing (e.g., pumping) process, in which the temperature may increase slightly from $T_1$ to $T_2$. 2-6 is a heat absorption process across a temperature gradient where the working fluid changes from liquid to gas (e.g., continuously) while the working fluid is heated from $T_2$ to $T_6$. The heat absorption process at 2-6 occurs in the high-pressure side of the trilateral thermodynamic cycle, and is linear or substantially linear over the entire temperature range $T_2$-$T_6$. 6-7 is an adiabatic gas expansion process that lowers the temperature and the pressure of the working fluid while the working fluid is still in the gas phase, the temperature of the working fluid is reduced to its condensation (e.g., boiling) point at the pressure in the cycle at 7. 7-1 is an isothermal condensation process at temperature $T_1$. The isothermal heat rejection process at 7-1 occurs in the low-pressure side of the trilateral thermodynamic cycle of FIG. 1D. The trilateral thermodynamic cycle of FIG. 1D may function as a heat engine in the discharging mode.

In the charging mode, the trilateral thermodynamic cycle of FIG. 1D may function as a heat pump. In the charging mode, 1-7 is an isothermal evaporation process at temperature $T_1$, and 7-6 is an adiabatic gas compression process that increases the temperature and the pressure of the working fluid (e.g., in the gas phase) from $T_1$ to $T_6$. 6-2 is a heat rejection process across a temperature gradient where the working fluid changes from gas to liquid while the working fluid is cooled from $T_6$ to $T_2$, and 2-1 is a pressure decreasing process (e.g., a process that performs mechanical work). In the charging cycle, the heat rejection process at 6-2 occurs in the high-pressure side of the cycle, and the heat absorption process at 1-7 occurs in the low-pressure side of the cycle. The trilateral thermodynamic cycle of FIG. 1D is substantially the same as the transcritical and trilateral thermodynamic cycle of FIG. 1B, except that the temperature gradient between 2 and 6 is linear over the entire or substantially the entire temperature range.

Figure 1E:
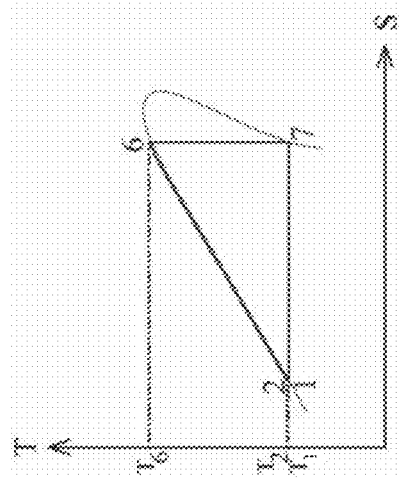

FIG. 1E shows a TS diagram for a reversible Rankine/vapor compression thermodynamic cycle. In discharging mode, 1-2 is a pressure increasing (e.g., pumping) process, in which the temperature may increase slightly from $T_1$ to $T_2$. 2-3 is a gradient heat absorption process in the high-pressure side of the cycle, where the working fluid is heated from $T_2$ to a temperature $T_3$. The process at 2-3 is linear or substantially linear over the entire temperature range $T_2$-$T_3$. 3-4 is an isothermal heat absorption process, in which the working fluid changes from liquid to gas. 4-6 is a heat absorption process across a temperature gradient in the high-pressure side of the Rankine thermodynamic cycle where the working fluid is heated from $T_3$ to $T_6$. 6-7 is an adiabatic gas expansion process that lowers the temperature and the pressure of the working fluid while the working fluid is still in the gas phase. 7-8 is a heat rejection process across a temperature gradient in the low-pressure side of the Rankine cycle that cools the working fluid from $T_7$ (which, as shown in FIG. 1E, may be higher than $T_3$) back to the first temperature $T_1$. 8-1 is an isothermal condensation process at temperature $T_1$. The temperature of the working fluid is reduced to its condensation (e.g., boiling) point at the pressure in the cycle at 8. The thermodynamic cycle of FIG. 1E may function as a heat engine in the discharging mode.

In the charging mode, the vapor compression thermodynamic cycle of FIG. 1E may function as a heat pump. In the charging mode, 1-8 is an isothermal evaporation process at temperature $T_1$, and 8-7 is a heat exchange process across a temperature gradient that heats the working fluid in the low-pressure side of the cycle from $T_1$ to $T_7$. 7-6 is an adiabatic gas compression process that increases the temperature of the working fluid from $T_7$ to $T_6$. 7-6 also increases the pressure of the working fluid. 6-4 is a heat rejection process across a temperature gradient in the high-pressure side of the cycle, where the working fluid is in the gas phase and is cooled from $T_6$ to $T_3$. 4-3 is an isothermal heat rejection process in which the working fluid is condensed (e.g., changed to the liquid phase) at its boiling point at the pressure in the cycle at 4. 3-2 is a gradient heat rejection process in the high-pressure side of the cycle, where the working fluid is cooled from $T_3$ to $T_2$. 2-1 is a pressure decreasing process (e.g., a process that performs mechanical work).

Each of the thermodynamic cycles of FIGS. 1A-E is reversible, and thus can be used to store and retrieve mechanical work as heat (or thermal energy) using two heat storage devices (see the discussion of FIG. 2 below). Where the thermodynamic cycle is storing mechanical energy, one heat storage device is absorbing heat and the other heat storage device is rejecting heat to increase the temperature difference (and optionally or alternatively, the pressure difference) between the heat storage devices, and where the cycle is retrieving mechanical energy, one heat storage device is rejecting heat and the other heat storage device is absorbing heat to decrease the temperature difference (and optionally or alternatively, the pressure difference) between the heat storage devices. In effect, the thermodynamic cycles of FIGS. 1A-E transfer heat from one heat storage device to the other, storing mechanical energy in the charging cycle, and retrieving the stored mechanical energy in the discharging cycle.

An Exemplary Layout

FIG. 2 shows an example of a layout for a thermo-mechanical energy regeneration (e.g., storage and retrieval) system using the exemplary cycles in FIGS. 1A-E. The reversible system includes a high pressure heat storage device 10, a gas pressure changing device 11, and a low pressure heat storage device 12. In the charging mode, the system includes a first liquid pressure changing device 15 (e.g., a turbine), and in the discharging mode, the system includes a second liquid pressure changing device 14 (e.g., a pump). The devices 10, 11, 12, and 14 or 15 are connected in a loop. As shown in FIG. 2, in a counterclockwise flow, the device works as a heat pump in charging mode, and in a clockwise flow, as a heat engine in discharging mode. Mode selection valves 13 and 16 select between the charging and discharging modes, depending on the input and/or output (or the device 15 or 14) selected.

The gas pressure changing device 11 may be a compressor in charging mode, and an expander in discharging mode. The liquid pressure changing device may be a turbine 15 in charging mode, and a pump 14 in discharging mode. In the charging mode, the compressor 11 receives mechanical energy, and the turbine 15 provides or performs mechanical work. In the discharging mode, the pump 14 receives mechanical energy, and the expander 11 provides or performs mechanical work.

The turbine 15 and the pump 14 are connected in parallel, with suitable valves (e.g., 3-way valves) 13 and 16 placed in the working fluid conduits upstream and downstream of the turbine 15 and the pump 14. Additionally, the compressor/expander 11 may comprise a screw compressor, a scroll compressor, a piston, or a vane compressor, which are examples of bidirectional devices that can function as a compressor in one direction and as an expander in the opposite direction, to provide the system with bidirectional operation in the high-pressure side of the thermodynamic cycle.

Depending on whether the thermodynamic cycle is that of a heat engine or a heat pump, in various examples, the pump (heat engine), turbine (heat pump), expander (heat engine) and compressor (heat pump) may constitute an adiabatic temperature-changing mechanism. Similarly, an adiabatic temperature-changing mechanism may comprise the expander or the compressor, depending on whether a temperature increase (compressor) or decrease (expander) is desired.

The high pressure heat storage device 10 transfers heat between the working fluid of the transcritical or trilateral cycle (e.g., see FIGS. 1A-D) and a solid heat storage medium, with a heat transfer across a temperature gradient in the storage device 10. The low pressure heat storage device 12 transfers heat between the working fluid and the solid phase heat storage medium in the low pressure heat storage device 12 with gradient and/or isothermal temperature heat transfers in the storage device 12. In addition, when using a Rankine/vapor compression cycle (e.g., see FIG. 1E), the high pressure heat storage device 10 will also have an isothermal heat transfer between the working fluid and the solid heat storage medium included in the heat storage device 10.

In the discharging mode, the working fluid passes from a low pressure liquid connection in the low pressure heat storage device 12 to a high-pressure liquid connection in the high pressure heat storage device 10 (and vice-versa in the charging mode). In the discharging mode, the working fluid passes from a high-pressure gas connection in the high pressure heat storage device 10 to a low-pressure gas connection in the low pressure heat storage device 12 (and vice-versa in the charging mode).

The solid heat storage materials in each of the high pressure and low pressure heat storage devices 10 and 12 may comprise concrete, metal, glass, ceramics, plastic, ice or another pure or mixed solid material. In one example, the heat storage device further comprises a framework of pipes (which may be made of copper, steel, plastic [e.g., polyvinyl chloride, or PVC], etc.) and a housing or mold that is relatively easy to transport and that generally has a relatively low weight (e.g., from 50 or 100 kg to 1000, 2000 or more kg, but generally, less than about 10,000 kg). The housing or mold may have dimensions providing a volume of from about 5 to about 1,000 $m^3$, and in one example, about 40-50 $m^3$). The housing or mold with the framework of substantially parallel pipes therein can be placed wherever there is room for it (e.g., on the ground, in the ground, or both), and it is subsequently filled with the solid heat storage material such as concrete (e.g., from about 10 to about $2.5 \times 10^6$ kg, and in the one example, about 100,000 kg). Such a heat storage device can have a quite large heat capacity and can be made at a low cost.

In the charging cycle, the working fluid (in the liquid phase) in a conduit at 1 absorbs heat from the heat storage device 12 isothermally and/or across an increasing temperature gradient. In the examples of FIGS. 1A-B and 1D-E, heat is absorbed isothermally from the heat storage device 12 (e.g., at 1-8 in the examples of FIGS. 1A and 1E, and at 1-7 in the examples of FIGS. 1B and 1D), during which the working fluid changes phase and becomes a gas. In the examples of FIGS. 1A and 1E, the gas-phase working fluid continues to absorb heat from the heat storage device 12 across a temperature gradient from 8 to the inlet of the conduit 7. In the example of FIG. 1C, the working fluid absorbs heat from the heat storage device 12 across an increasing temperature gradient. From 7, the working fluid is then compressed by the compressor 11, which increases the temperature and pressure of the gas-phase working fluid in conduit 6 relative to conduit 7. In the heat storage device 10 (which has a relatively high temperature range in comparison with the heat storage device 12), the working fluid rejects heat across a decreasing temperature gradient. In the examples of FIGS. 1A-1D, the heat rejection mechanism is the same (across a gradient, although not necessarily a linear gradient) from the outlet of conduit 6 to the inlet of conduit 2. In the example of FIG. 1E, the working fluid also rejects heat isothermally at 4-3, where it changes phase or condenses to a liquid. Referring back to FIG. 2, the working fluid is in the liquid phase by the time it reaches the conduit 2. From conduit 2, valve 16 directs the working fluid to turbine 15, where mechanical work is done (i.e., mechanical energy is released). The working fluid passes through valve 13 back to conduit 1, closing the cycle or loop.

In the charging cycle, the mechanical power absorbed by and/or added to the system is $W_{1C}$=the work performed on (or mechanical energy input into) the compressor 11, and the mechanical power produced by the system is represented by $W_{2C}$=the work output by the turbine 15. Thus, the net mechanical work required in the charging cycle is thus represented by $W_{in}=W_{1C}-W_{2C}$. Typically, $W_{in}$ is equal to the work input into the system necessary to transfer heat from the relatively cold heat storage device/medium to the relatively hot heat storage device/medium. The mechanical work performed by the turbine 15 as a result of the pressure release or decrease of the working fluid driving the turbine blades can be used to generate electricity, turn one or more wheels or propellers, generate air flow, or perform any other task or operation of a conventional turbine.

In the discharging cycle, the working fluid (in the liquid phase) in a conduit at 1 passes through the valve 13 to pump 14, then through the valve 16 to conduit 2, where it is transported to the heat storage device 10 (which has a relatively high temperature range in comparison with the heat storage device 12). The working fluid absorbs heat across an increasing temperature gradient in the heat storage device 10. In the examples of FIGS. 1A-1D, the heat absorption mechanism is the same from the outlet of conduit 2 to the inlet of conduit 6. In the example of FIG. 1E, the working fluid also absorbs heat isothermally at 3-4, where it changes phase or evaporates to a gas. The working fluid is then expanded by the expander 11, which decreases the temperature and pressure of the gas-phase working fluid in conduit 7 relative to conduit 6, and which allows mechanical work to be done. This is where the mechanical energy stored in the charging cycle is recovered. At 7-1, the working fluid rejects heat isothermally and/or across a decreasing temperature gradient to the heat storage device 12, during which the working fluid changes phase and becomes a liquid. In the examples of FIGS. 1A-B and 1D-E, heat is rejected isothermally to the heat storage device 12 (e.g., at 8-1 in the examples of FIGS. 1A and 1E, and at 7-1 in the examples of FIGS. 1B and 1D). In the examples of FIGS. 1A and 1E, the working fluid also rejects heat across a temperature gradient to the heat storage device 12 at 7-8. In the example of FIG. 1C, the working fluid rejects heat to the heat storage device 12 across a decreasing temperature gradient. The working fluid then returns back to conduit 1, closing the cycle or loop.

In the discharging cycle, the mechanical power absorbed by and/or added to the system is $W_{1D}$=the work performed by the pump 14, and the mechanical power produced by the system is represented by $W_{2D}$=the work output by the expander 11. Thus, the mechanical work performed by the system on one or more external devices in the discharging cycle is thus represented by $W_{out}=W_{2D}-W_{1D}$. The round trip efficiency of the system (e.g., of the combined charging and discharging cycles) may be defined as $W_{out}/W_{in}$.

Screw compressors/expanders, scroll compressors/expanders, piston compressors/expanders and/or vane compressors/expanders can all receive and provide mechanical work in known ways when functioning as a compressor or expander 11 (e.g., to generate electricity, turn one or more wheels or propellers, or perform any other task or operation of a conventional compressor or expander).

A Second Exemplary Thermo-Mechanical Energy Storage and Retrieval System

Figure 3:
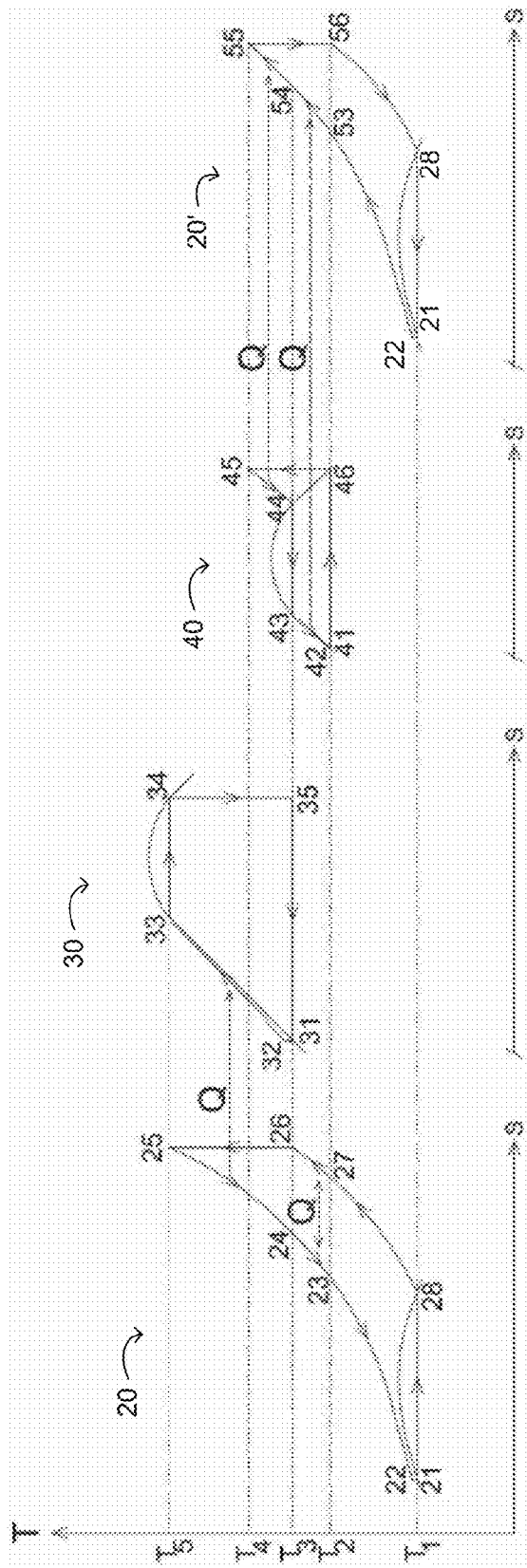
FIG. 3 is a TS diagram of a combined reversible transcritical cycle and Rankine heat engine and vapor compression heat pump cycles that, in separate charging and discharging cycles, can store and retrieve mechanical energy as heat or thermal energy according to one or more embodiments of the present invention.
Figure 4:
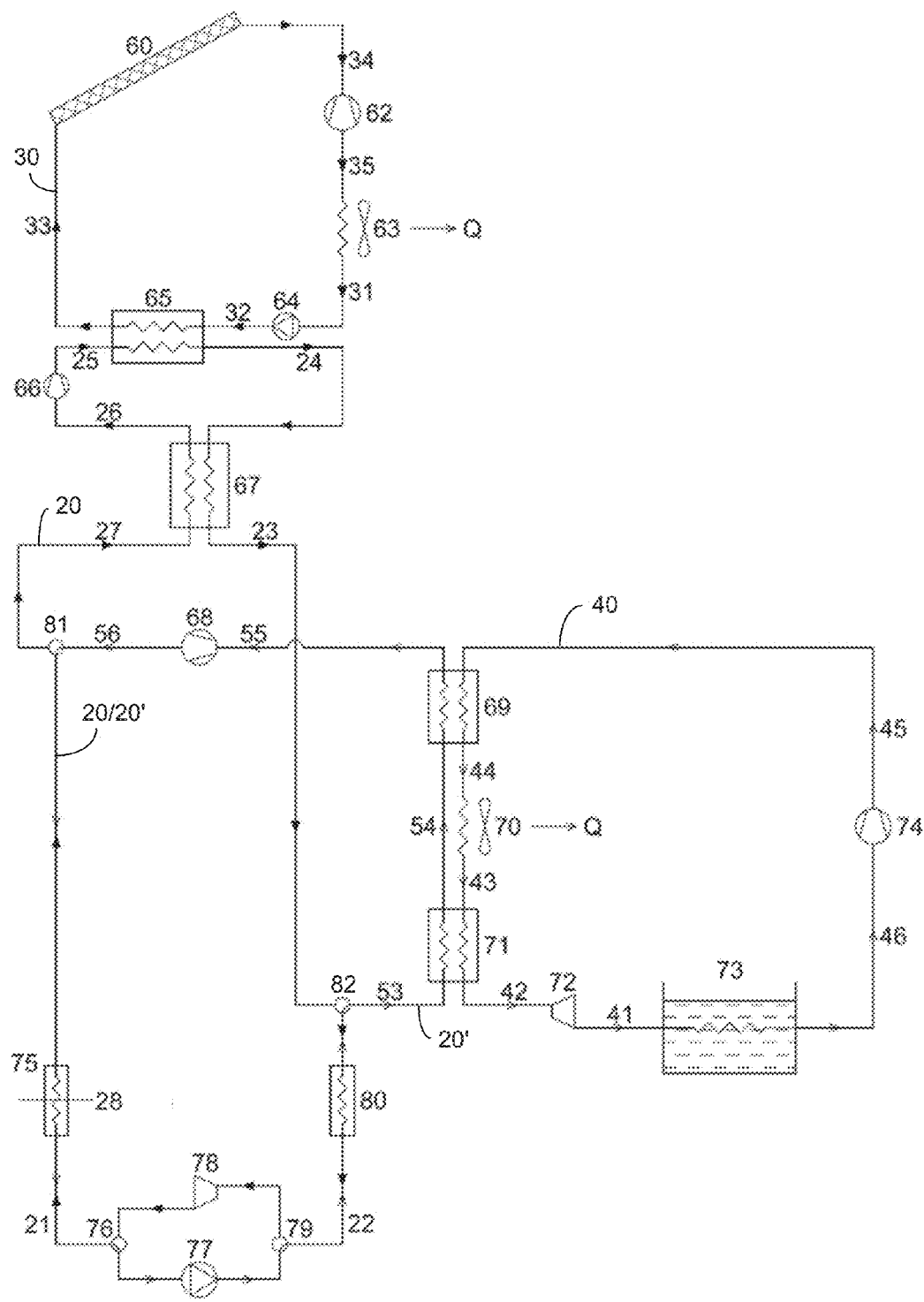
FIG. 4 is a layout diagram showing an exemplary system that stores and retrieves mechanical energy as heat or thermal energy using the exemplary transcritical, Rankine and vapor compression cycles of FIG. 3, according to one or more embodiments of the present invention.

FIG. 3 shows a TS diagram for an exemplary thermo-mechanical energy storage and retrieval system comprising a reversible transcritical cycle working as a heat pump 20 and as a heat engine 20', a Rankine heat engine cycle 30, and a vapor compression heat pump cycle 40 that, in separate charging and discharging cycles, can store and retrieve mechanical energy as heat (thermal energy). The transcritical cycles 20 and 20' operate substantially the same as the transcritical cycle in FIG. 1A. FIG. 4 shows a layout diagram of the thermo-mechanical energy storage and retrieval system of FIG. 3. In FIG. 4, the thermomechanical energy discharging cycle and its direction are designated by the hollow point arrows (i.e., →), and the thermomechanical energy charging cycle and its direction are designated by the solid point arrows (i.e., ─▶ ).

Referring to FIG. 3, the transcritical heat pump cycle 20 and the Rankine heat engine cycle 30 charge the system by absorbing heat from a heat storage device (not shown) attached to the low pressure side of the transcritical heat pump cycle 20, rejecting heat from the transcritical heat pump cycle 20 to the Rankine heat engine 30, performing mechanical work using the Rankine heat engine cycle 30, and rejecting heat to a heat storage device (not shown) attached to the high pressure side of the transcritical heat pump cycle 20. The Rankine heat engine cycle 30 also absorbs heat from an external heat source (e.g., the sun; not shown) to power the system in charging mode. The transcritical heat engine cycle 20' and the vapor compression heat pump cycle 40 discharge the system by absorbing heat from the high-pressure heat storage device, rejecting heat from the vapor compression heat pump cycle 40 to the transcritical heat engine cycle 20', receiving mechanical energy in the vapor compression heat pump cycle 40, and rejecting heat to the low-pressure heat storage device.

The Rankine heat engine cycle 30 absorbs heat from the transcritical heat pump cycle 20 in the high-pressure side of the Rankine cycle 30 across a temperature gradient from 32 to 33 ($Q_{32-33}$) and from outside the system (e.g., the sun) isothermally from 33 to 34 ($Q_{33-34}$), and provides mechanical work from 34 to 35. This mechanical work, together with $W_{22-21}$ in the transcritical heat pump cycle 20 (e.g., $W_{2C}=W_{34-35}+W_{22-21}$), represents the mechanical energy recovered by the system in FIG. 3 in the charging mode that is used to power the compressor for the compression process 26-25 and to power the pump in the pumping process 31-32. Consequently, the mechanical work input into the system $W_{1C}$ is $W_{26-25}$ plus $W_{31-32}$. The Rankine heat engine 30 rejects heat isothermally in the low-pressure side of the Rankine cycle 30 from 35 to 31 (e.g., $Q_{out}=Q_{35-31}$). In one example, the isothermal heat absorption mechanism comprises a solar energy collector, and the isothermal heat rejection mechanism comprises a vapor condenser. The isothermal heat absorption and rejection processes or mechanisms operate at different pressures. In such an embodiment, the Rankine heat engine 30 is powered during the daytime.

A pressure increasing (e.g., pumping) process is performed at 31-32 in the Rankine cycle 30, in which the temperature may increase slightly, then a gradient heat exchange process 32-33 in the Rankine cycle 30 absorbs heat (e.g., $Q_{in}=Q_{32-33}$) from a heat rejection process 25-24 across a temperature gradient in the transcritical cycle 20.

When the transcritical heat pump cycle 20 rejects heat across the gradient 25-24, the temperature of the working fluid in the transcritical cycle 20 decreases from temperature $T_5$ to temperature $T_3$. An internal heat exchange then takes place from a heat rejection process 24-23 in the high-pressure side of the cycle 20 across a temperature gradient to a heat absorption process 27-26 in the low-pressure side of the cycle 20. A heat exchanger can provide the process or be the mechanism for the internal heat exchange. 23-22 is another, sequential heat rejection process across a temperature gradient which can charge a high-pressure heat storage device with thermal energy. 22-21 is a pressure decreasing process (e.g., a process that performs mechanical work using the pressure of the working fluid, such as turning a turbine or driving a piston). 28-27 is a heat absorption process across a temperature gradient (e.g., from a second heat storage device), and 26-25 is an adiabatic gas compression process that increases the temperature and the pressure of the working fluid from $T_3$ to $T_5$.

When the system operates in discharging mode (e.g., during the night or otherwise in the absence of solar energy), the vapor compression heat pump cycle 40 receives or absorbs heat isothermally from 41 to 46 (i.e., $Q_{in}=Q_{41-46}$). Temperature $T_2$, the temperature at which the vapor compression heat pump 40 absorbs heat, is lower than the temperature of the environment ($T_3$), and is used for cooling (e.g., providing air conditioning to a house, building or other enclosure, such as a cold storage room or a refrigerated shipping container/vessel).

In the discharging mode, the vapor compression heat pump cycle 40 rejects heat isothermally at 44-43 (i.e., $Q_{out}=Q_{44-43}$) and across decreasing gradients 45-44 and 43-42 to increasing gradient heat absorption processes 53-54 and 54-55 in the transcritical cycle 20'. The transcritical cycle 20' also absorbs heat across a temperature gradient at 22-53 from the high-pressure heat storage device, and rejects heat across a temperature gradient and isothermally at 56-28 and 28-21, respectively, to the low-pressure heat storage device.

In the discharging mode, the mechanical power absorbed by and/or added to the system is $W_{1D}$=the work performed by a pump at 21-22 ($W_{21-22}$) and by a compressor at 46-45 ($W_{46-45}$), and the mechanical power produced by the system is represented by $W_{2D}$=the work output by an expander at 55-56 ($W_{55-56}$) and by a turbine at 42-41 ($W_{42-41}$). Thus, the mechanical work performed by the system on one or more external devices in the discharging cycle is thus represented by $W_{out}=W_{2D}-W_{1D}$. The round trip efficiency of the system may be defined as $W_{out}/W_{in}$.

Referring to FIG. 4, the Rankine heat engine 30 comprises a solar collector 60, which heats the working fluid isothermally (e.g., by causing the working fluid to change phase from a liquid to a gas in the high pressure side of the Rankine heat engine 30); an expander 62, which performs mechanical work and which decreases the temperature and the pressure of the working fluid; an isothermal heat exchanger 63, which condenses the working fluid at a lower pressure than that of the working fluid after evaporation by the solar collector 60; a pump 64, and a gradient heat exchanger 65, which absorbs heat rejected by the transcritical heat pump cycle 20. The transcritical heat pump cycle 20 performs a heat exchange process, which rejects heat that is absorbed by the Rankine heat engine 30 across the temperature gradient in the heat exchanger 65. The transcritical heat pump cycle 20 also includes a heat exchanger 67 and a compressor 66. The transcritical heat pump cycle 20 shares the first and second heat storage devices 75 and 80 and first through fourth valves 76, 79, 81 and 82 with the transcritical heat engine cycle 20'. However, transcritical heat engine cycle 20' further includes a pump 77 between valves 76 and 79, whereas the transcritical heat pump cycle 20 includes a turbine (or other mechanical work-producing device) between valves 79 and 76.

In FIG. 4, the vapor compression heat pump 40 includes a water tank 73 for cooling water held therein, along with a compressor 74, first, second and third heat exchangers 69, 70 and 71, and a turbine 72. In the transcritical cycle(s) 20/20' in FIG. 4, the gas pressure changing device may be a compressor 66 in charging mode, and an expander 68 in discharging mode. The liquid pressure changing device may be a turbine 78 in charging mode, and a pump 77 in discharging mode. In the charging mode, the compressor 66 receives mechanical energy, and the turbine 78 provides or performs mechanical work. In the discharging mode, the pump 77 receives mechanical energy, and the expander 68 provides or performs mechanical work.

In the example of FIGS. 3-4, the cycles 20 and 30, and separately, the cycles 20' and 40, work together with heat storage devices 75 and 80, and the energy storage and retrieval cycle time is 24 hours. The gradient heat transfers between different cycles are all internal (i.e., not with the environment or a component not in one of the cycles), so each of the energy storage and energy retrieval processes in the system appears to the outside as a single cycle, with isothermal heat transfers into ($Q_{in}$) and out from ($Q_{out}$) the system.

An Exemplary Heat Storage Device Using a Solid Medium

Figure 5A:
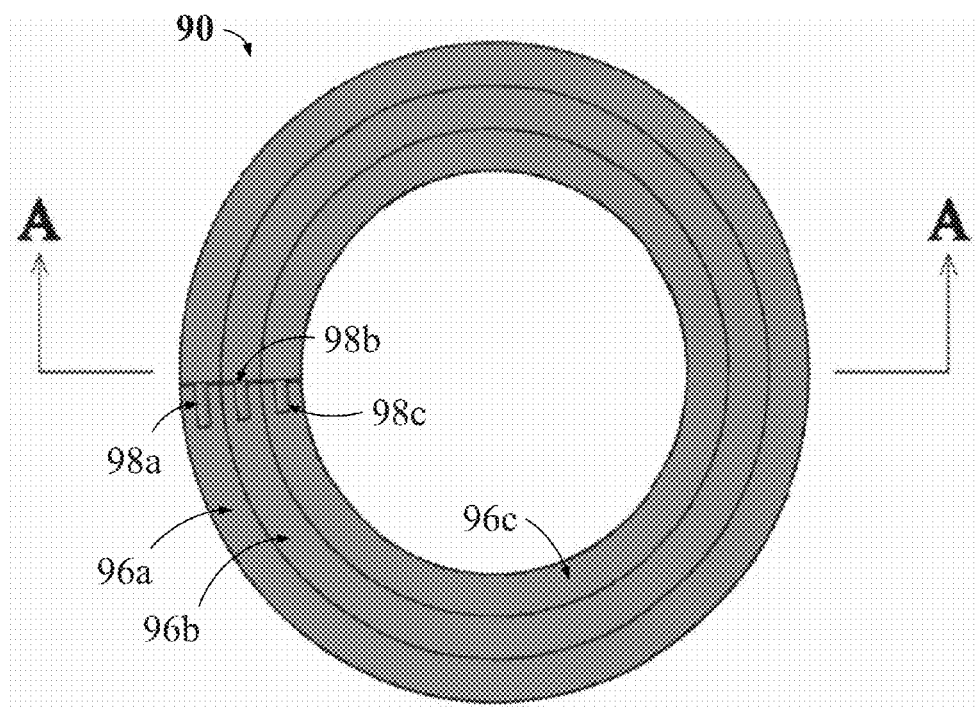
FIGS. 5A-B show an exemplary heat storage device suitable for use in the exemplary systems of FIGS. 2 and 4, according to one or more embodiments of the present invention.

In another aspect, the present invention concerns a heat storage device that includes a solid heat storage medium, suitable for use as either or both of the first and second heat storage devices in the present invention. For example, FIG. 5A shows a top down view of an exemplary heat storage device 90, which is an example of the first and second heat storage devices 75 and 80 in FIGS. 3-4.

Figure 5B:
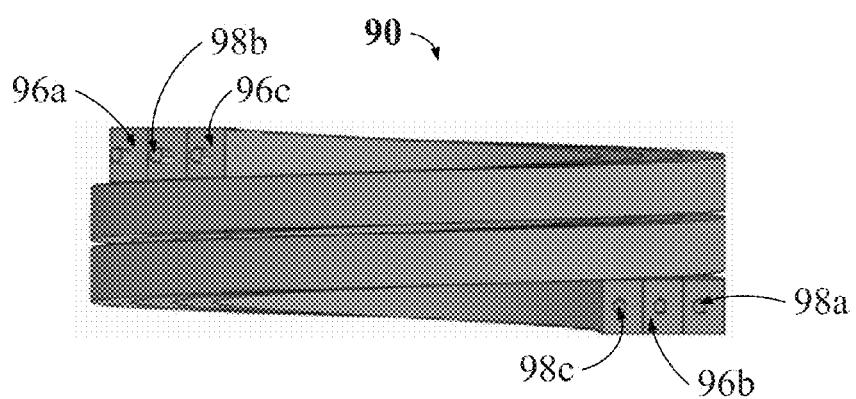

The exemplary heat storage device 90 includes three rings of solid storage material 96a, 96b and 96c. Less than three rings or more than three rings of material may be present. At least one ring of solid material is present in the heat storage device 90 (e.g., from 1 to 100 rings, such as 1-10 rings, 1-5 rings, or any number of rings or range of numbers of rings may be present). As is shown in FIG. 5B, the rings of material 96a, 96b and 96c may be spiral, but other forms or geometric shapes may be suitable. For example, the cross-sectional shape of the rings may be oval, square, rectangular, triangular, pentagonal, hexagonal, etc.

Each ring of material 96a, 96b and 96c may include one or more tubes or conduits 98a, 98b and/or 98c. The tubes or conduits 98a, 98b and/or 98c transport the working fluid through the heat storage device 90. While the exemplary heat storage device 90 of FIG. 5A includes one tube or conduit per ring, more than one tube or conduit may be present in each ring (e.g., 2, 3, 4, 5 or more tubes or conduits). Also, while the exemplary heat storage device 90 of FIG. 5A includes cylindrical tubes or conduits 98a, 98b and 98c, the tubes or conduits may have another shape or cross-sectional geometry.

FIG. 5B shows that the exemplary heat storage device 90 has a spiral or coiled shape. Thus, every 360°, the tubes or conduits 98a, 98b and 98c overlap, and are offset from the tubes or conduits 98a, 98b and 98c in an adjacent layer of the rings 96a, 96b and 96c by one thickness of the rings 96a, 96b and 96c. When the cross-sectional shape of the rings has straight sides along the periphery, the sides or lengths of the rings may be angled so that adjacent layers of the rings are offset by one thickness of the rings. At angles of or bends/turns in such heat storage device having multiple straight sides, the joints between tubes or conduits may be angled or curved.

One object of the design of the heat storage device is for the temperature in each cross section of the rings at the same height, level, or depth of the heat storage device to be the same or substantially the same. However, the rings 96a, 96b and 96c in the exemplary heat storage device 90 may have different diameters. For example, the innermost ring 96c may have the smallest diameter, and the outermost ring 96a may have the largest diameter. To increase the likelihood that the total heat per unit volume exchanged between the working fluid in the different tubes or conduits 98a, 98b and 98c and the solid material in the corresponding rings 96a, 96b and 96c is the same or substantially the same from ring to ring, modifications may be made to the rings and/or the tubes or conduits so that the ratio of the working fluid flow rate and the heat capacity of the solid heat storage material in the rings is relatively constant from ring to ring. For example, the distance between and/or diameter of the pipes in the innermost ring 96c, the outermost ring 96a and the middle ring 96b may be adjusted so that the working fluid flow through the tubes or conduits 98a, 98b and 98c and the heat capacity of the storage material is the same or substantially the same. Alternatively, a first pump or valve may decrease the flow rate of the working fluid through the innermost tube or conduit 98c relative to the middle tube or conduit 98b, and a second pump may increase the flow rate of the working fluid through the outermost tube or conduit 98a relative to the middle tube or conduit 98b. Alternatively, a second valve may decrease the flow rate of the working fluid through the middle tube or conduit 98b relative to the outermost tube or conduit 98a, but at a higher rate than the innermost ring 96c.

During installation, the tubes or conduits 98a-c may be spaced apart from each other and/or supported by a framework of spacers or bridges (not shown), which may comprise one or more rods or shafts connected between adjacent tubes or conduits in adjacent rings, both vertically and horizontally. The spacers or bridges may comprise a thermally insulative material, such as plastic, wood, glass or ceramic, etc.

The plurality of tubes or conduits 96a-c may be joined at both ends to an n-to-1 joint (where n is the number of tubes or conduits passing through the heat storage device 90). At one end, the n-to-1 joint is coupled in fluid communication to a valve (e.g., valve 13 or 16 [FIG. 2] or 76 or 79 [FIG. 4]), which is, in turn, in fluid communication with a first mechanical device (e.g., a pump) or a second mechanical device (e.g., a turbine), depending on the setting of the valve. At the other end, the n-to-1 joint is coupled in fluid communication to an expander and/or compressor (e.g., a dual-function expander/compressor 11 [FIG. 2] or a valve [e.g., 81 or 82 if FIG. 4], which is in turn couple to a conduit operatively connected to a compressor [e.g., 66 in FIG. 4] or an expander [e.g., 68 in FIG. 4], either or both of which may have one or more heat exchangers between the valve and the compressor or expander). To minimize heat losses during the transfer between various devices, the tubes or conduits may, when not part of a heat exchanger, be insulated (e.g., covered with a thermally insulative material) and/or have a minimal length between adjacent devices in the loop or cycle.

FIG. 6 shows a further embodiment 90' of the exemplary heat storage device 90, in which the tubes or conduits 91 are thermally connected to two or more thermal conductors 92a, each of which is thermally connected to a plurality of fins 92b. The embodiment 90' is taken along the cross-section A-A in FIG. 5A. The tubes or conduits 91 may be the same or substantially the same as the tubes or conduits 98a-c in FIGS. 5A-B, but the tubes or conduits 91 may comprise a thermally conductive material (e.g., a metal or metal alloy). The thermal conductors 92a may comprise the same or a different thermally conductive material as the tubes or conduits 91, and may extend in a plane parallel with the upper and lower surfaces of the rings 96a-c. Thus, the thermal conductors 92a may have a planar or substantially planar shape or form and be coplanar with the rings 96a-c.

The fins 92b may comprise the same or a different thermally conductive material as the tubes or conduits 91 and/or the thermal conductors 92a, and they may extend from the thermal conductors 92a above and/or below the thermal conductors 92a. While three fins 92b are shown extending both above and below the thermal conductors 92a, any integer number of fins 92b may be present (e.g., 1-10 fins). Furthermore, a different number of fins may be present in each ring 96a-c to facilitate exchange of the same or substantially the same amount of heat in each ring, or the fins in each ring may have a different height and/or surface area. The fins 92b may be parallel or substantially parallel to the walls of the housing 97.

A thermally insulative material 93 may be between layers of the rings 96a, 96b, and 96c, and may define the upper and lower surfaces of the rings 96a-c. The housing 97 may also comprise a thermally insulative material, such as plastic, wood, etc.

A Third Exemplary Thermo-Mechanical Energy Storage and Retrieval System

Figure 8:
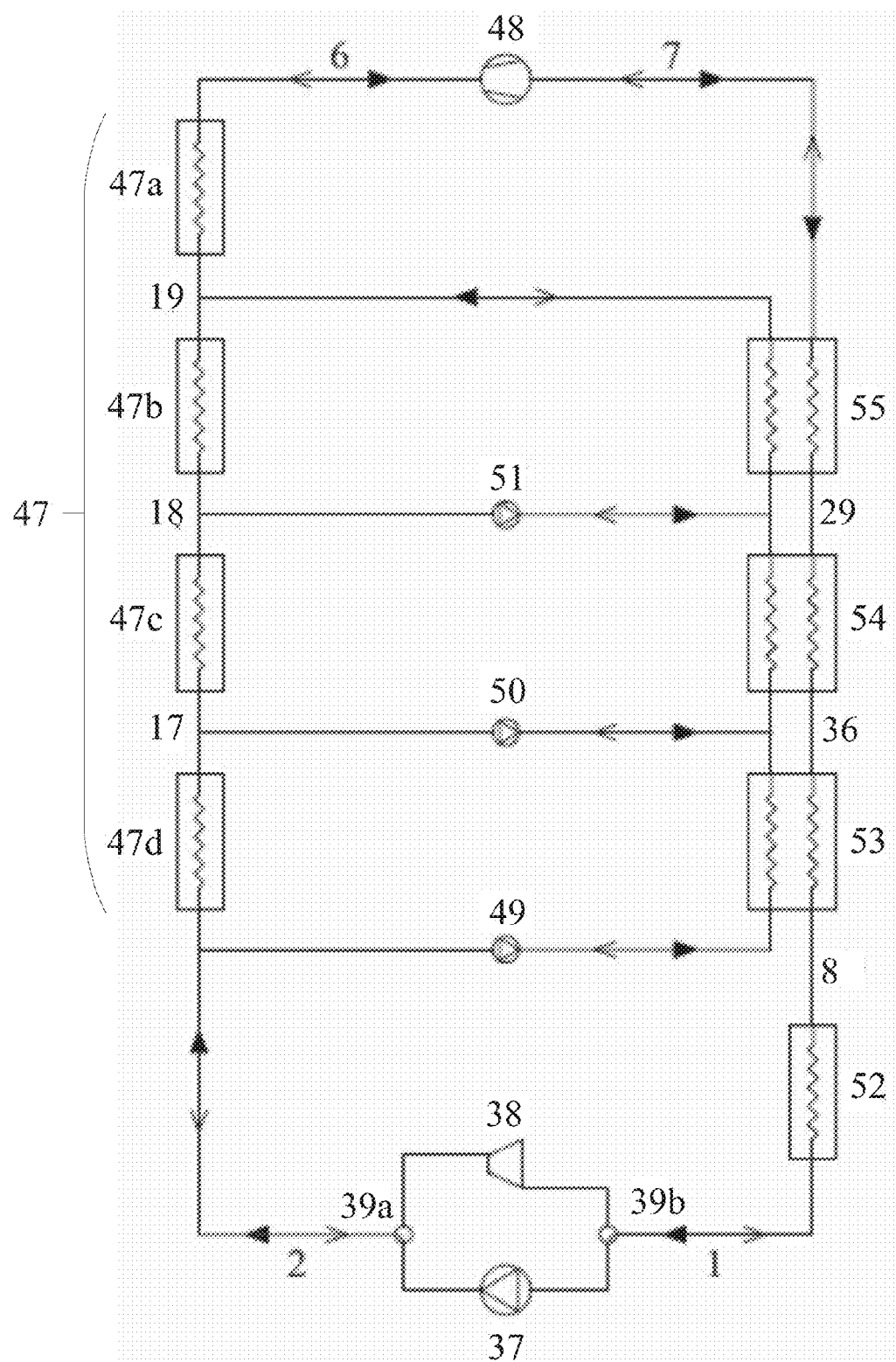
FIG. 8 is a diagram showing an exemplary layout for a system that stores and retrieves mechanical energy as heat or thermal energy using the exemplary reversible thermodynamic cycle of FIG. 7 and heat storage devices that include solid-phase storage media, according to one or more embodiments of the present invention.

FIGS. 7-8 respectively show a temperature-vs.-entropy ("TS") diagram for a reversible thermodynamic cycle and an exemplary layout of a system implementing the reversible thermodynamic cycle, capable of storing and retrieving mechanical energy as heat, using two heat storage devices. The reversible thermodynamic cycle of FIG. 7 and the layout in FIG. 8 are extensions of the cycles of FIG. 1A and the layout in FIG. 2.

FIG. 7 shows a TS diagram for a reversible transcritical thermodynamic loop or cycle. In discharging mode, 1-2 is a pressure increasing (e.g., pumping) process, in which the temperature may increase slightly (e.g., from a first temperature $T_1$ to a second temperature $T_2$). 2-17-18-19 is one or more gradient heat absorption process(es) where the working fluid is heated from $T_2$ to a third temperature $T_3$, from $T_3$ to a fourth temperature $T_4$, and from $T_4$ to a fifth temperature $T_5$. During each of the gradient heat absorption processes (or process segments) 2-17, 17-18, and 18-19 in the high pressure side of the cycle, part of the working fluid may exchange heat with (e.g., absorb heat from) the working fluid in a low pressure side of the cycle (e.g., in the gradient heat rejection processes 36-8, 29-36, and 7-29, respectively), and a remainder of the working fluid may exchange heat with (e.g., absorb heat from) the heat storage material in a high-pressure heat storage device or a high-pressure section of a single heat storage device (e.g., in gradient heat exchange processes at 2-17, 17-18, and 18-19), as described in more detail below with regard to FIG. 8. 19-6 is a further heat absorption process across a temperature gradient where the working fluid is heated from $T_5$ to a sixth temperature $T_6$ (e.g., in the high-pressure heat storage device or high-pressure section of a single heat storage device).

6-7 is an adiabatic gas expansion process that lowers the temperature and the pressure of the working fluid. In this part of the cycle, the working fluid is still in the gas phase. The temperature of the working fluid is reduced from $T_6$ at 6 to $T_5$ at 7. 7-29, 29-36, and 36-8 are one or more heat rejection process(es) across a temperature gradient that cool the working fluid from $T_5$ back to $T_4$, from $T_4$ to $T_3$, and from $T_3$ to $T_1$, respectively. 8-1 is an isothermal condensation (i.e., heat rejection) process at temperature $T_1$, where the second heat storage device absorbs the rejected heat.

The transcritical thermodynamic cycle of FIG. 7 may function as a heat engine. The heat absorption processes at 2-17, 17-18, 18-19 and 19-6 occur in the high-pressure side of the transcritical thermodynamic cycle, and the heat rejection processes at 7-29, 29-36, 36-8 and 8-1 occur in the low-pressure side of the transcritical thermodynamic cycle.

The cycle is reversed in the charging mode, in which case the transcritical thermodynamic cycle of FIG. 7 may function as a heat pump. In the charging mode, 1-8 is an isothermal evaporation (i.e., heat absorption) process at temperature $T_1$. 8-36, 36-29 and 29-7 are one or more gradient heat exchange process(es) that heat the working fluid in the transcritical cycle from $T_1$ to $T_3$, $T_3$ to $T_4$, and $T_4$ to $T_5$, respectively. 7-6 is an adiabatic gas compression process that increases the temperature of the working fluid (e.g., in the gas phase) from $T_5$ to $T_6$. 7-6 also increases the pressure of the working fluid. 6-19-18-17-2 is a gradient heat rejection process where the working fluid changes from gas to liquid while the working fluid is cooled from $T_6$ to $T_2$, and 2-1 is a pressure decreasing process (e.g., a process that performs mechanical work using the pressure of the working fluid, such as turning the blades of a turbine). In the charging cycle, the heat rejection process at 6-19-18-17-2 occurs in the high-pressure side of the transcritical thermodynamic cycle, and the heat absorption process(es) at 1-8-36-29-7 occur in the low-pressure side of the transcritical thermodynamic cycle.

During each of the gradient heat rejection processes (or process segments) 19-18, 18-17, and 17-2 in the high pressure side of the cycle, part of the working fluid may exchange heat with (e.g., reject heat to) the working fluid in the low pressure side of the cycle (e.g., in the gradient heat absorption processes 8-36, 36-29, and 29-7, respectively), and a remainder of the working fluid may exchange heat with (e.g., reject heat to) the heat storage material in a high-pressure heat storage device or a high-pressure section of a single heat storage device (e.g., in the gradient heat exchange processes at 19-18, 18-17, and 17-2). 6-19 is a further gradient heat absorption process where the temperature of the working fluid decreases from $T_6$ to $T_5$ (e.g., in the high-pressure heat storage device or high-pressure section of a single heat storage device).

The transcritical thermodynamic cycle of FIG. 7 may function as a heat engine or heat pump in a thermal energy storage system, and thus may charge the thermal energy storage system (not shown) by removing heat from one heat storage device to another heat storage device in the energy storage system and building a temperature difference between the two heat storage devices in the charging loop/mode. In a discharging loop or mode, the energy can be retrieved by moving the heat back again to the original heat storage device and reducing the temperature difference between the two heat storage devices.

FIG. 8 shows an example of a layout for a thermo-mechanical energy regeneration (e.g., storage and retrieval) system using the exemplary loop or cycle in FIG. 7. The reversible system includes a high pressure heat storage device 47, a gas pressure changing device 48, heat exchangers 55, 54 and 53, and a low pressure heat storage device 52. In the charging mode (the flow of which is designated by hollow point arrows →), the system includes a first liquid pressure changing device 38, and in the discharging mode (the flow of which is designated by solid point arrows ▶), the system includes a second liquid pressure changing device 37. The devices 47, 48, 52-55, and 37 or 38 are connected in a loop. As shown in FIG. 8, in a counterclockwise flow, the device works as a heat pump in charging mode, and in a clockwise flow, as a heat engine in discharging mode. Mode selection valves 39a-b select between the charging and discharging modes, depending on the input and/or output (or the device 37 or 38) selected.

The gas pressure changing device 48 may be a compressor in charging mode, and an expander in discharging mode. The liquid pressure changing device may be a turbine 38 in charging mode, and a pump 37 in discharging mode. In the charging mode, the compressor 48 receives mechanical energy, and the turbine 38 provides or performs mechanical work. In the discharging mode, the pump 37 receives mechanical energy, and the expander 48 provides or performs mechanical work.

The turbine 38 and the pump 37 are connected in parallel, with suitable valves (e.g., 3-way valves) 39a and 39b placed in the working fluid conduits upstream and downstream of the turbine 38 and the pump 37. Additionally, the compressor/expander 48 may comprise a screw expander/compressor, a scroll expander/compressor, a piston expander/compressor, or a vane expander/compressor. The pump 37, the turbine 38, and the expander/compressor 48 may each constitute an adiabatic temperature-changing mechanism.

The high pressure heat storage device 47 transfers heat between the working fluid of the transcritical cycle and a first solid heat storage medium, with a heat transfer across a temperature gradient in the storage device 47. The low pressure heat storage device 52 transfers heat isothermally between the working fluid and a second solid heat storage medium. The high pressure and low pressure heat storage devices 47 and 52 may be similar to or substantially the same as the high pressure and low pressure heat storage devices 10 and 12 in FIG. 2. For example, the solid heat storage materials in each of the high pressure and low pressure heat storage devices 47 and 52 may comprise concrete, metal, glass, ceramics, plastic or another pure or mixed solid material. In certain embodiments, the solid heat storage materials have a relatively constant heat capacity, particularly over the temperature range in which it is typically in operation.

In the charging cycle, the working fluid (in the liquid phase) in a conduit at 1 absorbs heat from the heat storage device 52, where the fluid is vaporized and flows through heat exchangers 53, 54 and 55. The heat exchangers 53, 54 and 55 heat the working fluid across a temperature gradient from $T_1$ to $T_3$ to $T_4$ to $T_5$ (the heat is effectively transferred from the heat rejection process 19-2). From 7, the working fluid is then compressed by the compressor 48, which increases the temperature and pressure of the gas-phase working fluid in conduit 6 relative to conduit 7. The working fluid then enters the first section 47a of the first heat storage device 47 at 6, and releases energy and drops in temperature from $T_6$ to $T_5$. At 19, the working fluid is split into two flows, where the first flow passes through the second section 47b in the first heat storage device 47 to release one portion of the energy, and the second flow is directed to the heat exchanger 55 to release another portion of the energy. The temperature of the working fluid in both flows is at the same time decreasing from $T_5$ to $T_4$. The same process is repeated for (i) the third and the fourth sections 47c and 47d of the first heat storage device 47 at 18 and 17 and (ii) the heat exchangers 54 and 53, respectively, where the temperature of the working fluid decreases from $T_4$ to $T_3$ to $T_5$, and finally, after the turbine 38, to $T_1$. The pumps 49, 50 and 51 shunt the working fluid between the two flows and regulate the portion of the fluid that passes through the heat exchangers 53, 54, and 55 to match the heat necessary for heating the working fluid in the increasing temperature gradient process 8-7.

In the heat storage device 47, the working fluid rejects heat across a decreasing temperature gradient. In the example of FIG. 8, the heat rejection process in each of the sections or stages 47a-d is the same or substantially the same from the outlet of conduit 2 to the inlet of conduit 6. However, section or stage 47a has a relatively high temperature range in comparison with the heat storage device section or stage 47d, and the working fluid can change phase or condense to a liquid at substantially any point or location in the heat storage device 47.

In the system of FIG. 8, there are one or more joints or valves at 19, 18, 17 and/or 2 that divert or transfer part of the working fluid through or receive part or all of the working fluid from the heat exchangers 53, 54 and 55. The interfaces between heat storage device sections or stages 47a-c and the conduits or tubes 19, 18, 17 and 2 from the joints or valves may be at points or locations in a single, continuous heat storage device, such as is shown in FIGS. 5A-B and 6, that split the flow of working fluid into predetermined or calculated portions that balance the difference in heat capacity of the working fluid between the high pressure side and the low pressure side of the loop. For example, in the charging mode, at 19, part of the working fluid from heat storage device section or stage 47a is diverted or transferred back to heat exchanger 55; at 18, part of the working fluid from heat storage device section or stage 47b is diverted or transferred to heat exchanger 54; and at 17, part of the working fluid from heat storage device section or stage 47c is diverted or transferred to heat exchanger 53. In one implementation, the pumps 49-51 are bi-directional pumps that, with appropriate flow control, regulate the working fluid flow to adjust for proper heat transfer in the heat exchangers 53, 54 and 55, respectively. In this arrangement, the temperature gradients across heat storage device sections or stage 47b and heat exchanger 55, heat storage device sections or stage 47c and heat exchanger 54, and heat storage device sections or stage 47d and heat exchanger 53 are substantially the same and have substantially the same endpoints (e.g., the temperature of the working fluid at 7 and 19 is the same, the temperature of the working fluid at 29 and 18 is the same, and the temperature of the working fluid at 36 and 17 is the same).

The system of FIG. 8 compensates for any differences in the heat capacity of the fluid (e.g., at different temperatures), and the mass or heat capacity of the heat storage medium can be reduced accordingly. The system of FIG. 8 is therefore advantageous in a high capacity system (e.g., where the demand for energy storage and retrieval is high), but in which the available space for heat storage and/or heat absorption is limited (e.g., if the system includes a solar collector and the available space and/or hours or intensity of daylight are limited).

From conduit 2, valve 39a directs the working fluid to turbine 38, where mechanical work is done (i.e., mechanical energy is released). The working fluid passes through valve 39b back to conduit 1, closing the charging cycle or loop. In FIG. 8, valves 39a-b are shown in the discharging cycle configuration.

In the charging cycle, the mechanical power absorbed by and/or added to the system is $W_{1C}$=the work performed by the compressor 48, and the mechanical power produced by the system is represented by $W_{2C}$=the work performed by the turbine 38. Thus, the mechanical work required by the system in the charging cycle is thus represented by $W_{in}=W_{2C}-W_{1C}$. The mechanical work performed by the turbine 38 as a result of the pressure of the working fluid driving the turbine blades can be used to generate electricity, turn one or more wheels or propellers, or perform any other task or operation of a conventional turbine.

In the discharging cycle, the working fluid (in the liquid phase) in a conduit at 1 passes through the valve 39b to pump 37, then through the valve 39a to conduit 2, where it is transported to the heat storage device 47. The working fluid absorbs heat across an increasing temperature gradient in the heat storage device 47. The working fluid also changes phase or evaporates to a gas in one or more of the sections or stages 47a-d of the heat storage device 47. In the discharging cycle, part of the working fluid from conduit 2 and each of the heat storage device sections or stages 17 and 18 are pumped to heat exchangers 53, 54 and 55, respectively, for internal heat exchange or transfer as explained above.

The working fluid is then expanded by the expander 48, which decreases the temperature and the pressure of the gas-phase working fluid in conduit 7 relative to conduit 6, and which allows mechanical work to be done. For example, screw, scroll, vane and piston expanders can all perform or provide mechanical work in known ways to perform the functions of the expander 48 (e.g., to drive a generator to generate electricity, turn one or more wheels or propellers, or perform any other task or operation of a conventional expander). This is where the mechanical energy stored in the charging cycle is recovered. In the heat exchangers 53, 54 and 55, the working fluid exchanges heat across a temperature gradient, and in the heat storage device 52, the working fluid rejects heat isothermally, at which point the working fluid changes phase and becomes a liquid. The working fluid then returns back to conduit 1, closing the cycle or loop.

In the discharging cycle, the mechanical power input into the system is $W_{1D}$=the work performed by the pump 37, and the mechanical power produced by the system is represented by $W_{2D}$=the work output by the expander 47. Thus, the mechanical work performed by the system on one or more external devices in the discharging cycle is thus represented by $W_{out}=W_{2D}-W_{1D}$. The round trip efficiency of the system may be defined as $W_{out}/W_{in}$.

A Fourth Exemplary Thermo-Mechanical Energy Storage and Retrieval System

Figure 10:
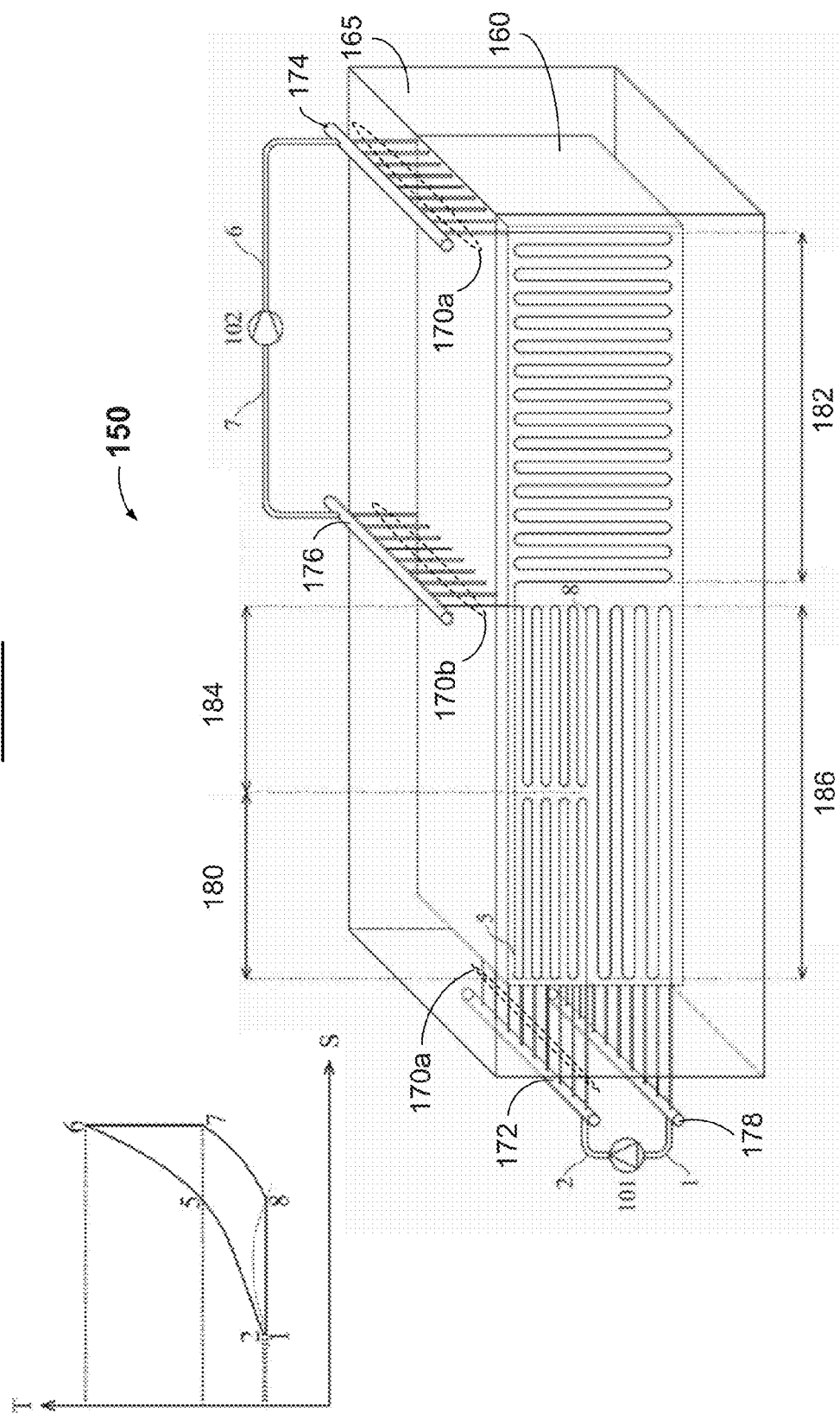
FIG. 10 is a layout diagram showing an alternative embodiment of the exemplary system of FIG. 9.

FIGS. 9-10 show exemplary thermo-mechanical energy storage and retrieval systems implementing the reversible transcritical thermodynamic cycle of FIG. 1A, capable of storing and retrieving mechanical energy as heat using a single heat storage device. For convenience, a variation of the TS diagram of FIG. 1A is shown in each of FIGS. 9-10. The points 1, 2, 5, 6, 7 and 8 in the TS diagram are also shown in the diagrams of FIGS. 9-10.

FIG. 9 shows an exemplary system 100 that includes a liquid pressure changing device (e.g., a turbine and/or a pump) 101, a gas pressure changing device (e.g., a compressor and/or an expander) 102, a network of pipes or conduits 120a-b between the liquid pressure changing device 101 and the gas pressure changing device 102, and a heat storage device through which the pipes or conduits 120a-b pass. The heat storage device includes a solid heat storage material 110, surrounded by an insulator 115. As discussed herein, in the discharging mode of the transcritical cycle, the liquid pressure changing device 101 may comprise a pump, and the gas pressure changing device 102 may comprise an expander. In the charging mode of the transcritical cycle, the liquid pressure changing device 101 may comprise a turbine, and the gas pressure changing device 102 may comprise a compressor.

When the transcritical cycle is in the charging mode, a plurality of parallel pipes or conduits 120b transport working fluid from the turbine 101 through the heat storage medium 110 to the compressor 102 in the low pressure side of the cycle/heat storage device, and a similar or identical plurality of parallel pipes or conduits 120a transport the working fluid from the compressor 102 through the heat storage medium 110 to the turbine 101 in the high pressure side of the cycle/heat storage device. When the transcritical cycle is in discharging mode, the pipes or conduits 120a transport the working fluid from the pump 101 through the heat storage medium 110 to the expander 102 in the high pressure side of the cycle/heat storage device, and the pipes or conduits 120b transport the working fluid from the expander 102 through the heat storage medium 110 to the pump 101 in the low pressure side of the heat storage device. A distribution/collection tube or pipe (e.g., manifold) 122, 124, 126 or 128 joins the pipes or conduits 120a or 120b to an inlet/outlet tube, pipe or conduit to or from the liquid pressure changing device 101 or the gas pressure changing device 102.

The heat storage device has four heat transfer zones. A first zone 130 in the center section of the heat storage device is in the high-pressure side of the transcritical cycle, and transports the working fluid in two phases (e.g., liquid and gas). In the first zone 130, the working fluid exchanges heat with the heat storage medium 110 across a temperature gradient. The heat exchange process in the first zone 130 is 2-5 or 5-2 in the TS diagram, depending on whether the cycle is in discharging mode or charging mode, respectively.

A second zone 132 in the upper section of the heat storage device is in the high-pressure side of the transcritical cycle, and transports the working fluid in the gas phase. In the second zone 132, the working fluid exchanges heat with the heat storage medium 110 across a temperature gradient. The heat exchange process in the second zone 132 is 5-6 or 6-5 in the TS diagram, depending on whether the cycle is in discharging mode or charging mode, respectively.

A third zone 134 in the center section of the heat storage device is in the low-pressure side of the transcritical cycle, and transports the working fluid in the gas phase. In the third zone 134, the working fluid exchanges heat with the heat storage medium 110 across a temperature gradient. The heat exchange process in the third zone 134 is 7-8 or 8-7 in the TS diagram, depending on whether the cycle is in discharging mode or charging mode, respectively. The temperature at an inlet or entrance of the third zone 134 is the same or substantially the same as at an outlet or exit of the first zone 130.

A fourth zone 136 in the lower section of the heat storage device is in the low-pressure side of the transcritical cycle, and transports the working fluid in two phases (e.g., liquid and gas). In the fourth zone 136, the working fluid exchanges heat with the heat storage material 110 isothermally. The heat exchange process in the fourth zone 136 is 8-1 or 1-8 in the TS diagram, depending on whether the cycle is in discharging mode or charging mode, respectively. The temperature at an inlet or entrance of the fourth zone 136 is the same or substantially the same as at the inlet or entrance of the first zone 130.

In the charging mode, the working fluid in the fourth zone 136 absorbs heat from the heat storage material 110 isothermally, where it changes phase from liquid to gas (e.g., at 8). In the third zone 134, the working fluid absorbs heat from the heat storage material 110 across a temperature gradient. Tube (e.g., manifold) 126 collects the gas-phase working fluid, where it is transported to compressor 102 and distributed at a higher pressure and temperature to the pipes or conduits 120a in the second zone 132 by the tube or manifold 124.

In the second zone 132, the working fluid rejects heat to the heat storage medium 110, causing the temperature of the working fluid to decrease from 6 to 5 (and the temperature of the heat storage material in the second zone 132 to increase). In the first zone 130, the working fluid (which is now in both the liquid and gas phases) continues to reject heat to the heat storage medium 110 across a temperature gradient. The condensed or substantially condensed working fluid is collected by tube or manifold 122 and used to drive the turbine 101, thus decreasing the temperature and pressure of the working fluid, and recovering mechanical energy. The dual-phase working fluid is then distributed to the pipes or conduits 120b in the fourth zone 136 by the tube or manifold 128, thus completing the charging cycle.

In the discharging mode, the cycle is reversed from the charging mode. For example, the working fluid in the pipes or conduits 120a in the first zone 130 absorbs heat across a gradient from 2 to 5 in the heat storage medium 110 (i.e., substantially the same gradient as in the discharging mode, but reversed), causing the temperature of the working fluid to increase. The temperature of the heat storage material 110 is lower at the bottom of the first zone 130 than it is at the top of the first zone 130 (e.g., at 5). When the working fluid reaches the second zone 132, it is substantially entirely in the gas phase. The working fluid continues to absorb heat across a gradient from the heat storage medium 110 in the second zone 132. Thus, the temperature of the heat storage material 110 increases from the bottom of the second zone 132 (e.g., at 5) to the top of the second zone 132.

The hot, high-pressure, gas-phase working fluid is collected by tube or manifold 124 and expanded by expander 102, decreasing the temperature and pressure of the working fluid. This is where the mechanical energy is recovered from the system 100. The low-pressure working fluid is then distributed to the pipes or conduits 120b in the third zone 134 by tube or manifold 126, where it rejects heat to the heat storage material 110. The temperature of the heat storage material 110 decreases from the top of the third zone 134 to the bottom of the third zone 134 (e.g., at 8), by substantially the same temperature differential as the first zone 130. The low-pressure working fluid rejects heat isothermally to the heat storage material 110 in the fourth zone 136, where it condenses into the liquid phase. The temperature of the heat storage material 110 in the fourth zone 136 is substantially constant. Tube or manifold 128 collects the liquid-phase working fluid, where it is transported to pump 101. The working fluid is pumped to and distributed by the tube or manifold 122 to the pipes or conduits 120a in the first zone 130, thus completing the discharging cycle.

FIG. 10 is a layout showing an alternative embodiment of the exemplary system of FIG. 9. The exemplary system 150 of FIG. 10 includes the liquid pressure changing device 101, the gas pressure changing device 102, a network of pipes or conduits 170a-b between the liquid pressure changing device 101 and the gas pressure changing device 102, distribution/collection tubes or pipes (e.g., manifolds) 172, 174, 176 and 178, and a heat storage device through which the pipes or conduits 170a-b pass. The heat storage device includes a solid heat storage material 160, surrounded by an insulator 165. The liquid pressure changing device 101 and the gas pressure changing device 102 may be as discussed herein for the systems that implement transcritical cycles. The system 150 implements a reversible transcritical cycle in the same or substantially the same manner as system 100 of FIG. 9.

The four heat transfer zones of the heat storage device include a first zone 180 in an upper outermost section of the heat storage device, a second zone 182 in a side of the heat storage device laterally opposite from the first zone 180, a third zone 184 in an upper central section of the heat storage device (e.g., between the first and second zones 180 and 182), and a fourth zone 186 in a lower outer section of the heat storage device (e.g., below the first and third zones 180 and 184). The first, second, third and fourth zones 180, 182, 184 and 186 have characteristics and functions the same as or substantially the same as the first, second, third and fourth zones 130, 132, 134 and 136 in FIG. 9. However, the pipes or conduits 170a in the second zone 182 are arranged vertically (i.e., the pipes or conduits 170a transport the working fluid vertically between bends in the pipes or conduits 170a). A vertical arrangement of pipes or conduits results in a horizontal temperature gradient in the zone, thereby facilitating a longer temperature gradient (and thus more efficient heat transfer) in the zone. In zones that transport the working fluid in the gas phase only, the pipes or conduits may be arranged vertically. However, if the working fluid includes some liquid, the pipes or conduits should be arranged horizontally to minimize or avoid the possible formation of gas pockets in the pipes or conduits. Furthermore, the pipes or conduits 170a and the pipes or conduits 170b cross each other at an entrance/exit of the third zone 184, and a portion of the pipes or conduits 170a passes through the third zone 184, although alternative arrangements and/or configurations of the pipes or conduits 170a-b and the first through fourth zones 130, 132, 134 and 136 are possible.

CONCLUSION/SUMMARY

Thus, the present invention provides systems and methods for storing and/or retrieving mechanical energy as heat. The systems and methods generally include a liquid pressure changing device, a high pressure heat storage device (or section of a single heat storage device), a gas pressure changing device, a low pressure heat storage device (or section of a single heat storage device), and a working fluid in a loop. The loop works as a heat pump in a charging mode and as a heat engine in a discharging mode. The working fluid and solid heat storage materials in the high and low pressure heat storage devices or sections transfer or exchange heat (i.e., the high and low pressure heat storage devices may each comprise a regenerator).

The effects of the present invention include simplicity, a closed system, and small second law losses using solid heat storage media. The present system and method advantageously provide an extended temperature range similar to a Brayton cycle, and compression and expansion losses similar to those in a Rankine cycle. Storage and retrieval of heat may be done in the high and low pressure heat storage devices with a relatively small temperature difference between the working fluid and the heat storage material(s). Accordingly, the present system can store and retrieve thermal energy with relatively small second law losses.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A thermo-mechanical energy storage system working in a loop having a high pressure side and a low pressure side, comprising:
    one or more heat storage devices including one or more solid heat storage materials with a high pressure liquid connection, a high pressure gas connection, a low pressure liquid connection, and a low pressure gas connection;
    a gas pressure changing device connected between said high pressure gas connection and said low pressure gas connection;
    a liquid pressure changing device connected between said low pressure liquid connection and said high pressure liquid connection; and
    a working fluid in said loop, wherein the working fluid is in a gas phase in between said high pressure gas connection and said low pressure gas connection, and is in a liquid phase between said low pressure liquid connection and said high pressure liquid connection;
    wherein:
        said one or more heat storage devices comprises (i) a skeleton or framework of pipes or tubes, the one or more solid heat storage materials forming a relatively thick heat storage skin around the pipes or tubes, and (ii) an isolation material that thermally isolates adjacent layers of the pipes or tubes from each other;
        said working fluid and said one or more solid heat storage materials transfer or exchange heat across a temperature gradient between said high pressure gas connection and said high pressure liquid connection;
        said loop works as a heat pump in a charging mode and as a heat engine in a discharging mode; and
        said working fluid flows in one direction in the charging mode and in an opposite direction in the discharging mode.

2. The thermo-mechanical energy storage system of claim 1, wherein in said discharging mode, said liquid pressure changing device comprises a pump, and said gas pressure changing device comprises an expander.

3. The thermo-mechanical energy storage system of claim 1, wherein in said charging mode, said liquid pressure changing device comprises a turbine, and said gas pressure changing device comprises a compressor.

4. The thermo-mechanical energy storage system of claim 1, wherein said one or more heat storage devices comprises:
    a high pressure heat storage device including a first solid heat storage material, wherein said high pressure heat storage device includes said high pressure liquid connection and said high pressure gas connection, and said working fluid and said first solid heat storage material transfer or exchange heat across said temperature gradient; and
    a low pressure heat storage device including a second solid heat storage material, wherein said low pressure heat storage device includes said low pressure liquid connection and said low pressure gas connection, and said working fluid and said second solid heat storage material transfer or exchange heat isothermally and/or across another gradient.

5. The thermo-mechanical energy storage system of claim 1, wherein said working fluid comprises air, a noble gas, water, carbon dioxide, ammonia, a liquid metal, a liquid salt, or an organic fluid.

6. The thermo-mechanical energy storage system of claim 1, wherein said working fluid comprises a combination of air, a noble gas, water, carbon dioxide, ammonia, one or more liquid metals, one or more liquid salts, and/or one or more organic fluids.

7. The thermo-mechanical energy storage system of claim 1, wherein said one or more solid heat storage materials comprises concrete, metal, glass, a ceramic, or plastic.

8. The thermo-mechanical energy storage system of claim 1, wherein said loop comprises a reversible thermodynamic loop or cycle.

9. The thermo-mechanical energy storage system of claim 8, wherein said loop comprises a reversible transcritical, trilateral, or Rankine/vapor compression thermodynamic loop or cycle.

10. The thermo-mechanical energy storage system of claim 4, wherein said loop comprises a transcritical or Rankine loop or cycle, and said working fluid transfers or exchanges heat isothermally with said second solid heat storage material.

11. The thermo-mechanical energy storage system of claim 4, wherein said loop comprises a thermodynamic loop or cycle, and said working fluid transfers or exchanges heat (i) across said temperature gradient with said first solid heat storage material, and (ii) isothermally and across at least one temperature gradient with said second solid heat storage material.

12. The thermo-mechanical energy storage system of claim 4, wherein each of said high pressure and low pressure heat storage devices comprises:
    a prefabricated skeleton or framework of pipes or tubes;
    a form or housing containing said prefabricated skeleton or framework of pipes or tubes; and
    said one or more solid heat storage materials, wherein said one or more solid heat storage materials are contained within said form or housing.

13. The thermo-mechanical energy storage system of claim 12, wherein each of said high pressure and low pressure heat storage devices further comprises said isolation material, wherein said isolation material maintains the pipes or tubes in position during transportation and/or introduction of the solid heat storage material into the form or housing.

14. A method of storing energy, comprising:
    a) absorbing heat in a liquid-phase working fluid at least in part isothermally in a low pressure side of a thermodynamic cycle from a solid heat storage material in a first heat storage device or a first section thereof, thereby changing at least some of the liquid-phase working fluid to a gas-phase working fluid;
    b) compressing or otherwise increasing a pressure and a temperature of the gas-phase working fluid;
    c) rejecting heat across a temperature gradient from the gas-phase working fluid in a high-pressure side of the thermodynamic cycle to a solid heat storage material in a second heat storage device or a second section of the first heat storage device, thereby changing at least some of the gas-phase working fluid to a liquid-phase working fluid; and d) performing mechanical work using the liquid-phase working fluid as the liquid-phase working fluid moves from the second heat storage device to the first heat storage device or from the second section to the first section of the first heat storage device;

wherein at least said first heat storage device comprises (i) a skeleton or framework of pipes or tubes, the one or more solid heat storage materials forming a relatively thick heat storage skin around the pipes or tubes, and (ii) an isolation material that thermally isolates adjacent layers of the pipes or tubes from each other.

15. The method of claim 14, wherein performing mechanical work using the liquid-phase working fluid comprises driving a turbine with the liquid-phase working fluid.

16. A method of retrieving energy, comprising:
a) absorbing heat in a liquid-phase working fluid in a high pressure side of a thermodynamic cycle across a temperature gradient from a solid heat storage material in a first heat storage device or a first section thereof, thereby changing at least some of the liquid-phase working fluid to a gas-phase working fluid;

b) expanding or otherwise decreasing a pressure of the gas-phase working fluid to perform mechanical work using the gas-phase working fluid;

c) rejecting heat from the gas-phase working fluid at least in part isothermally in a low-pressure side of the thermodynamic cycle to a solid heat storage material in a second heat storage device or a second section of the first heat storage device, thereby changing at least some of the gas-phase working fluid to a liquid-phase working fluid; and d) pumping the liquid-phase working fluid from the second heat storage device to the first heat storage device or from the second section to the first section of the first heat storage device;

wherein at least said first heat storage device comprises (i) a skeleton or framework of pipes or tubes, the one or more solid heat storage materials forming a relatively thick heat storage skin around the pipes or tubes, and (ii) an isolation material that thermally isolates adjacent layers of the pipes or tubes from each other.

17. The method of claim 16, further comprising reversing a flow of the working fluid, absorbing heat in a liquid-phase working fluid in the low pressure side of the thermodynamic cycle from the solid heat storage material in the second heat storage device or a second section of the first heat storage device, thereby changing at least some of the liquid-phase working fluid to the gas-phase working fluid, and rejecting heat from the gas-phase working fluid in the high pressure side of the thermodynamic cycle to the solid heat storage material in the first heat storage device or the first section thereof, thereby changing at least some of the gas-phase working fluid to the liquid-phase working fluid.

18. A method of making a heat storage device, comprising:
a) assembling a skeleton or framework of pipes or tubes;
b) thermally isolating adjacent layers of the pipes or tubes from each other using a thermal isolation material;
c) forming a form or housing of the heat storage device, said form or housing containing said skeleton or framework of pipes or tubes and said thermal isolation material; and
d) pouring one or more solid heat storage materials in temporary liquid form into said form or housing when the form or housing is at a final destination or location of the heat storage device.

19. The method of claim 18, wherein the skeleton or framework of pipes or tubes permits the temporary liquid form of the solid heat storage material(s) to flow along the pipes or tubes and substantially fill the form or housing and produce a relatively thick heat storage skin around the pipes or tubes.

20. The method of claim 18, further comprising converting the temporary liquid form of the solid heat storage material(s) into said solid heat storage material(s).

21. The thermo-mechanical energy storage system of claim 1, wherein said loop comprises a Rankine/vapor compression loop or cycle.

22. The thermo-mechanical energy storage system of claim 1, wherein said pipes or tubes are configured horizontally where said working fluid and said one or more solid heat storage materials transfer or exchange heat isothermally and vertically where said working fluid and said one or more solid heat storage materials transfer or exchange heat across said temperature gradient.

23. The thermo-mechanical energy storage system of claim 1, wherein said one or more heat storage devices consists of a single heat storage device, and said working fluid and said one or more heat storage devices transfer or exchange heat (i) across a temperature gradient between said high pressure gas connection and said high pressure liquid and (ii) at least in part isothermally between said low pressure liquid connection and said low pressure gas connection.

24. The thermo-mechanical energy storage system of claim 4, wherein said loop comprises a transcritical or Rankine loop or cycle, and said working fluid transfers or exchanges heat isothermally and across a temperature gradient with said second solid heat storage material.

* * * * *